Feb. 17, 1953
L. E. DE NEERGAARD
2,628,539
METHOD AND MEANS FOR RECORDING AND REPRODUCING DISPLACEMENTS
Filed Jan. 4, 1945
11 Sheets-Sheet 1
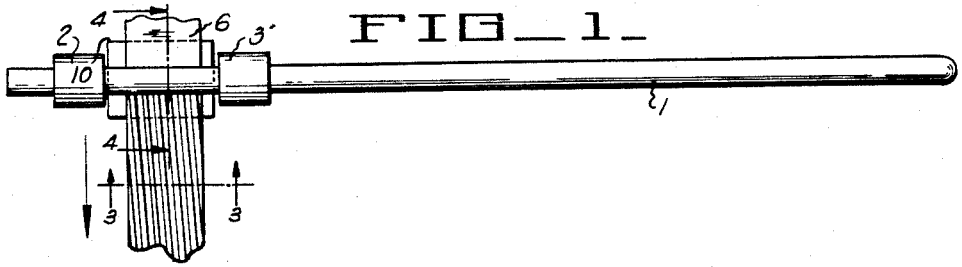
FIG_1_
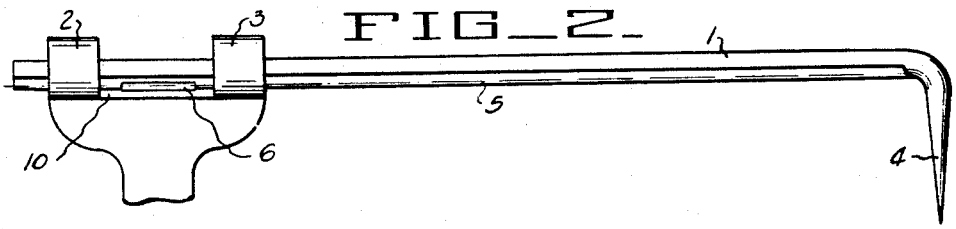
FIG_2_
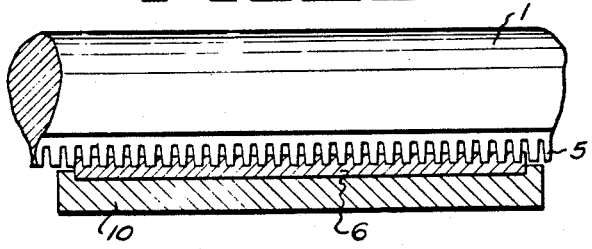
FIG_3_
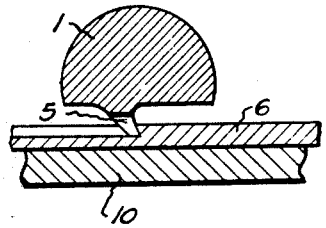
FIG_4_
FIG_5_
Leif Eric de Neergaard
INVENTOR Feb. 17, 1953 — L. E. DE NEERGAARD — 2,628,539
METHOD AND MEANS FOR RECORDING AND REPRODUCING DISPLACEMENTS
Filed Jan. 4, 1945 — 11 Sheets-Sheet 2
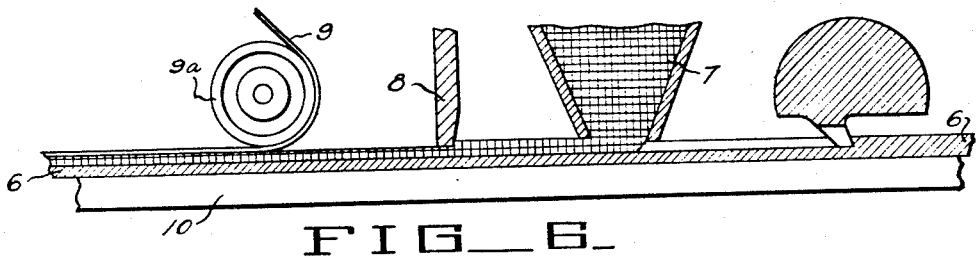
FIG_6_
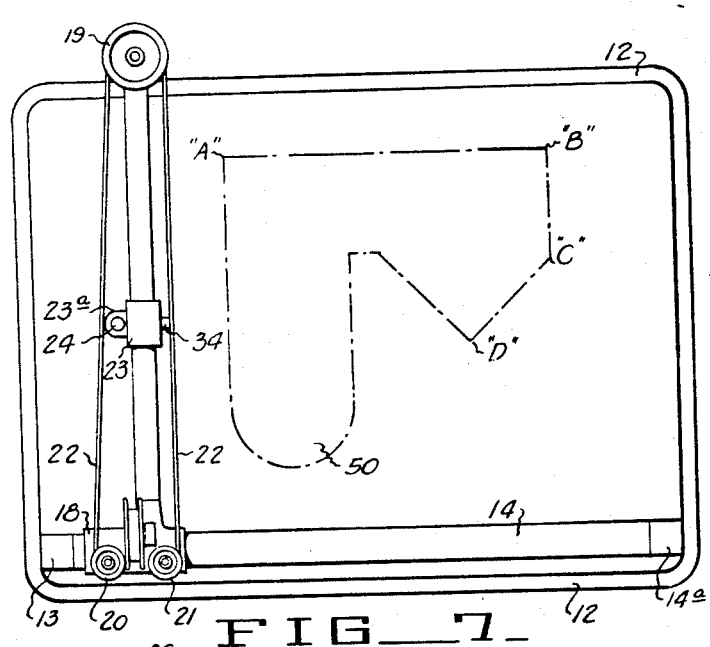
FIG_7_
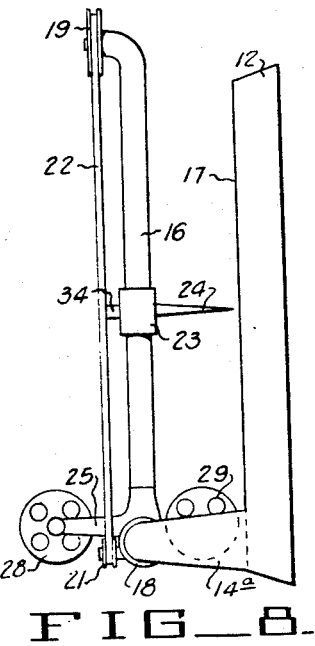
FIG_8_
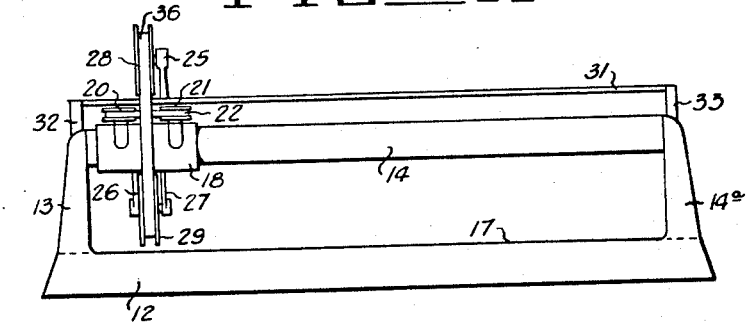
FIG_9_
*Leif Eric de Neergaard*
INVENTOR

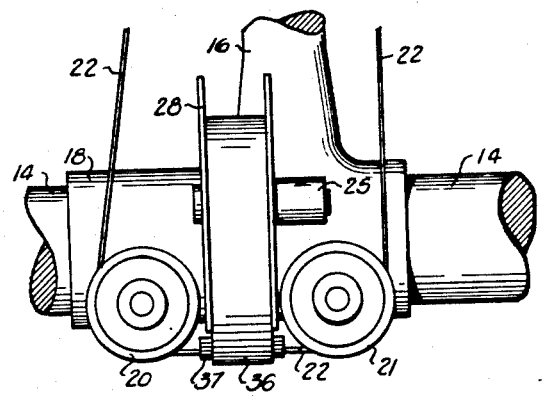
FIG_10_
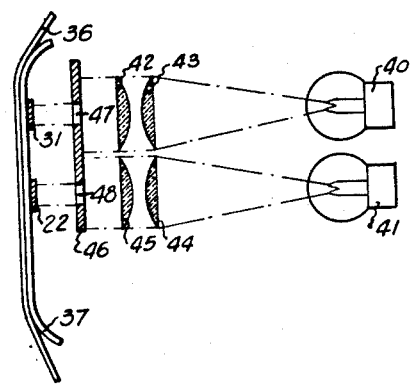
FIG_11_
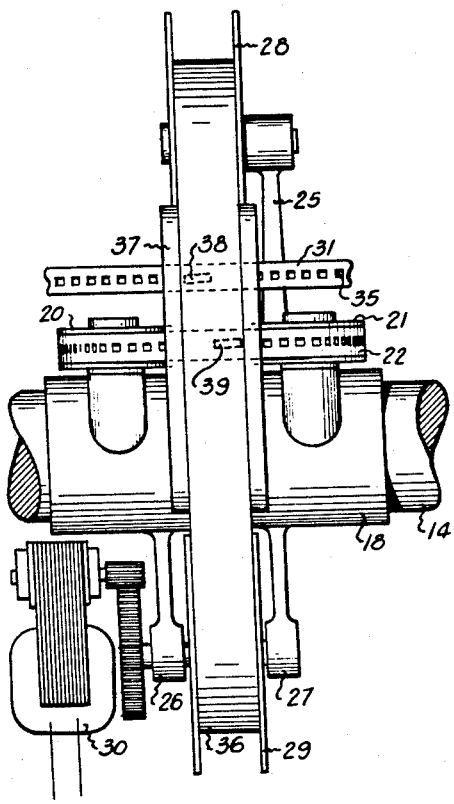
FIG_12_
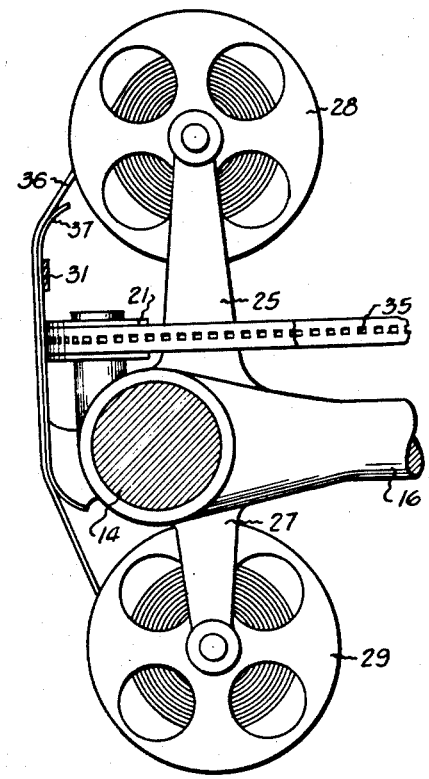
FIG_13_

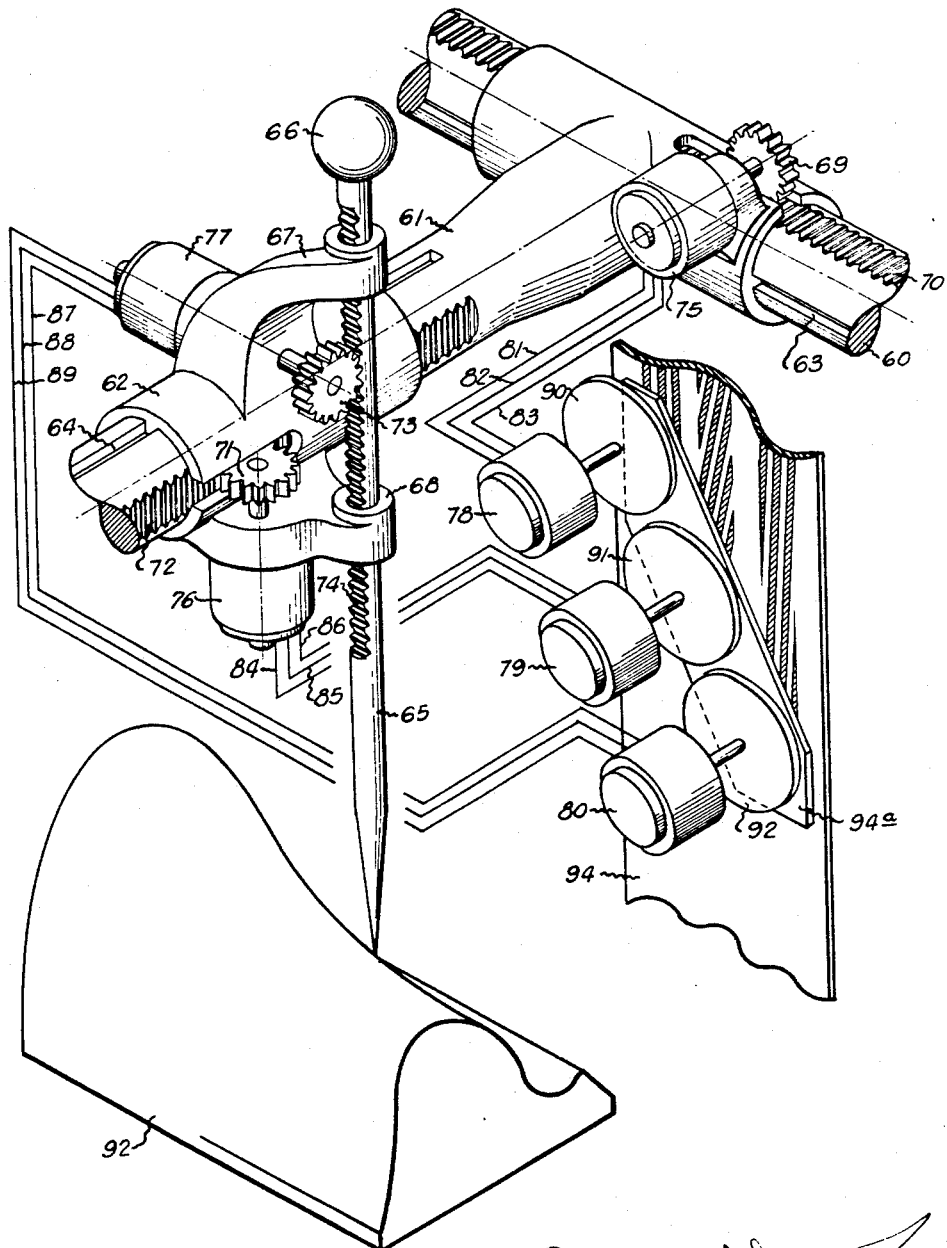

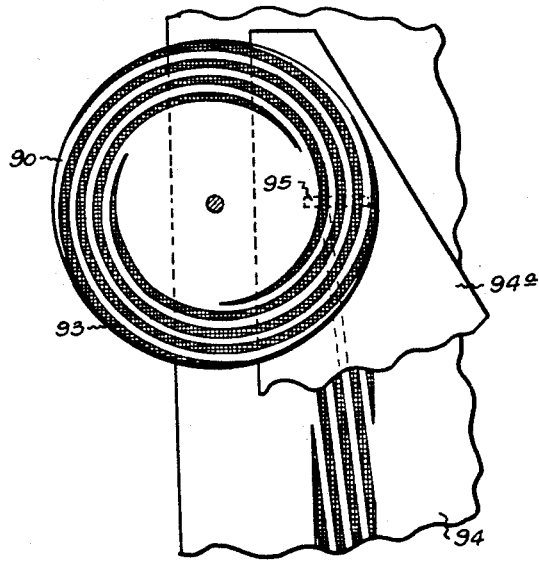
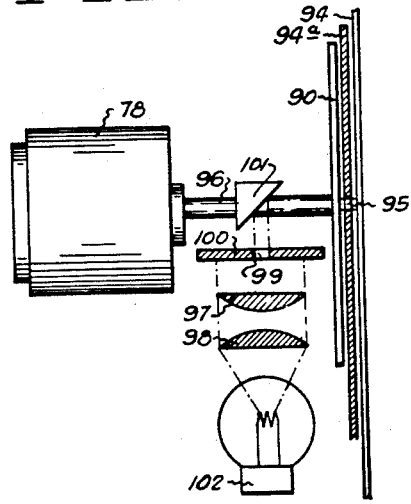
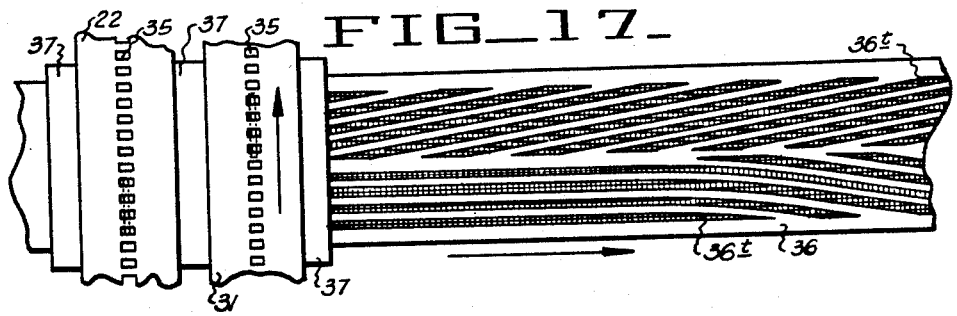
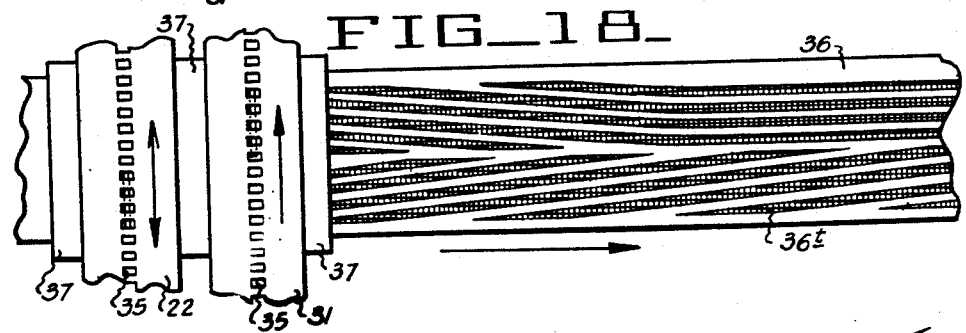

Feb. 17, 1953  L. E. DE NEERGAARD  2,628,539
METHOD AND MEANS FOR RECORDING AND
REPRODUCING DISPLACEMENTS
Filed Jan. 4, 1945  11 Sheets-Sheet 6
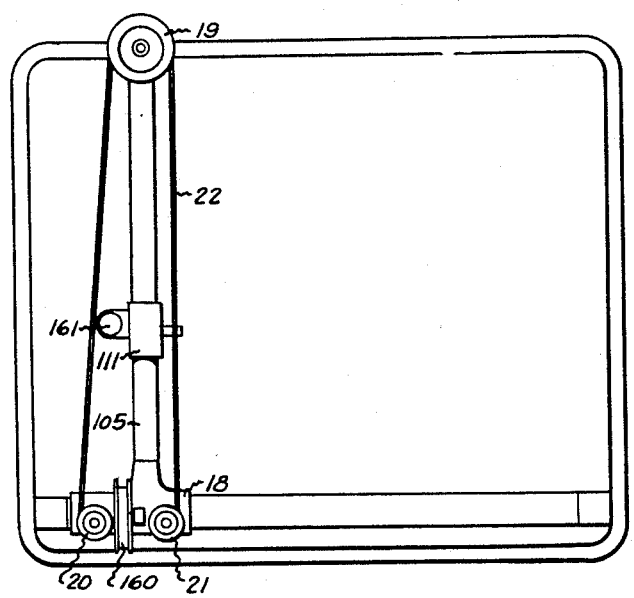
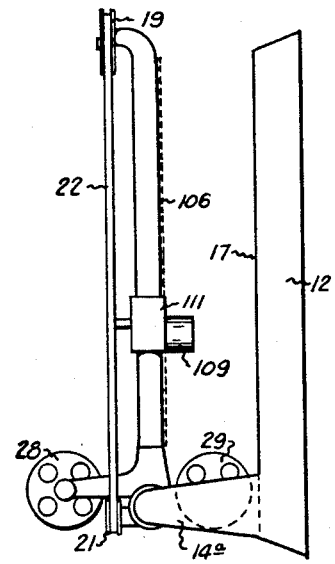
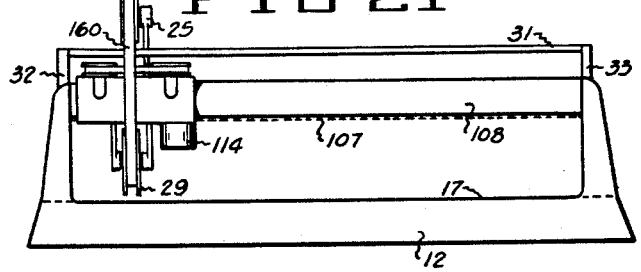
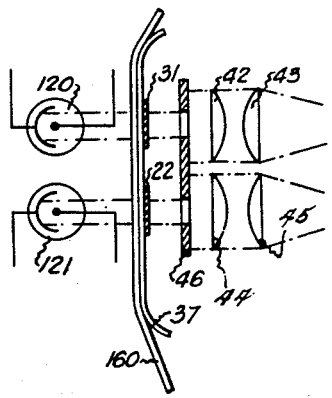
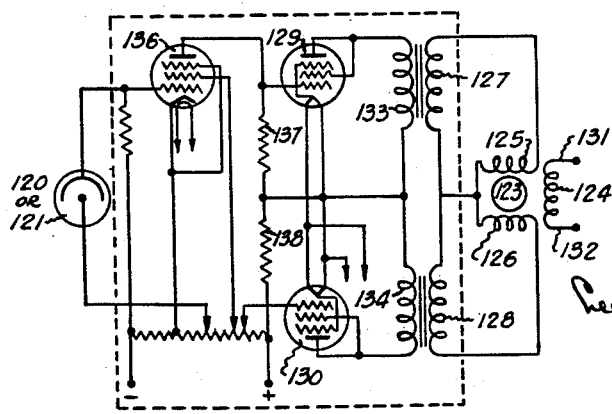

Feb. 17, 1953 L. E. DE NEERGAARD 2,628,539
METHOD AND MEANS FOR RECORDING AND
REPRODUCING DISPLACEMENTS
Filed Jan. 4, 1945 11 Sheets-Sheet 7
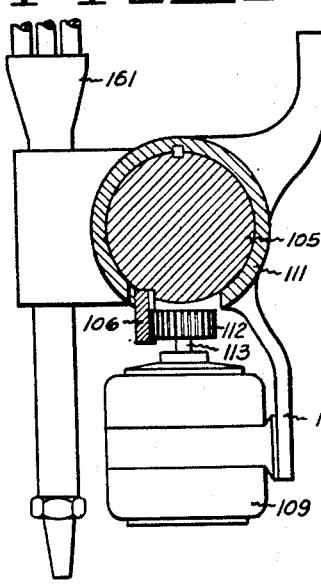
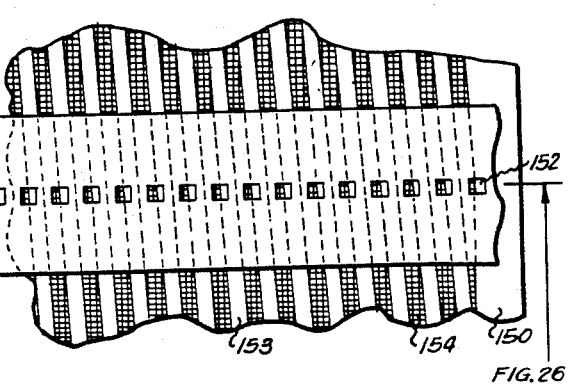
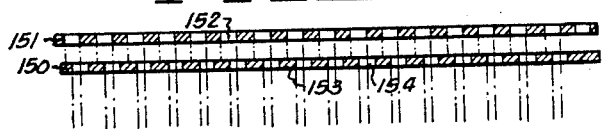
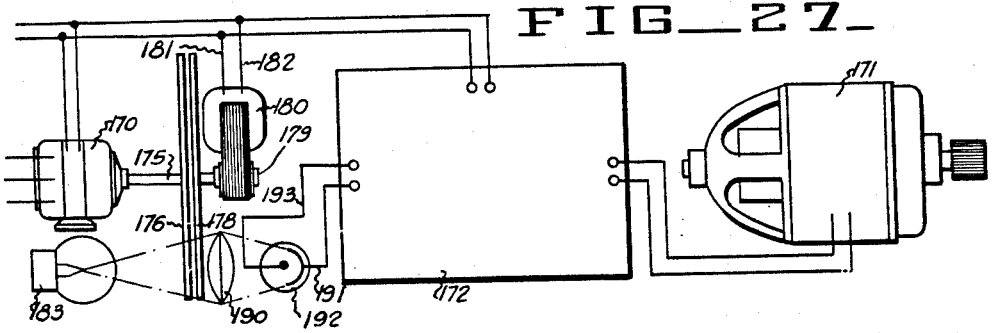
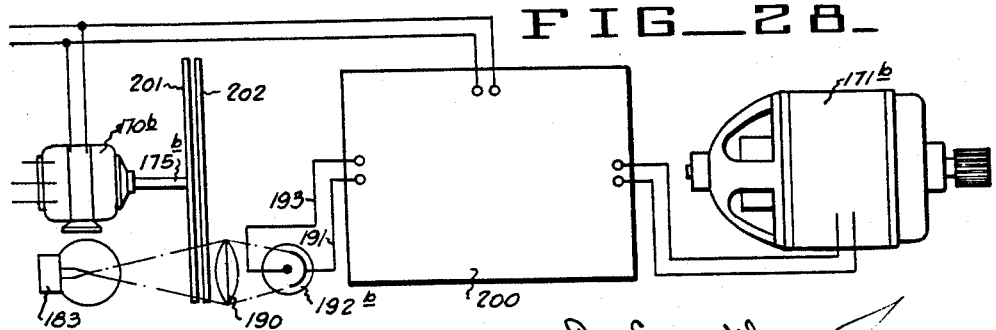
Leif Eric de Neergaard
INVENTOR

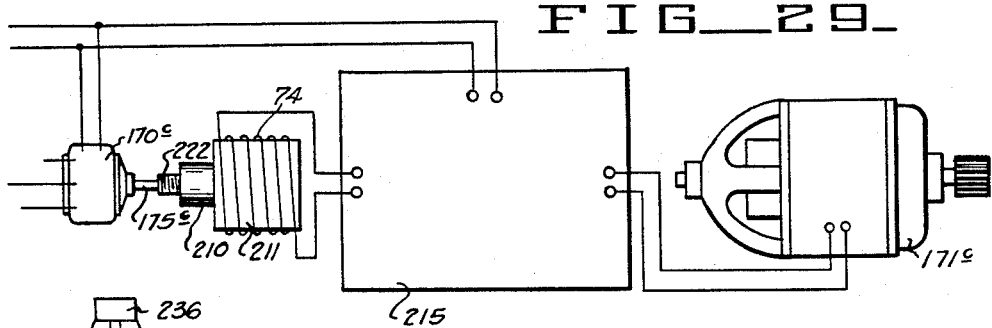
FIG_29_
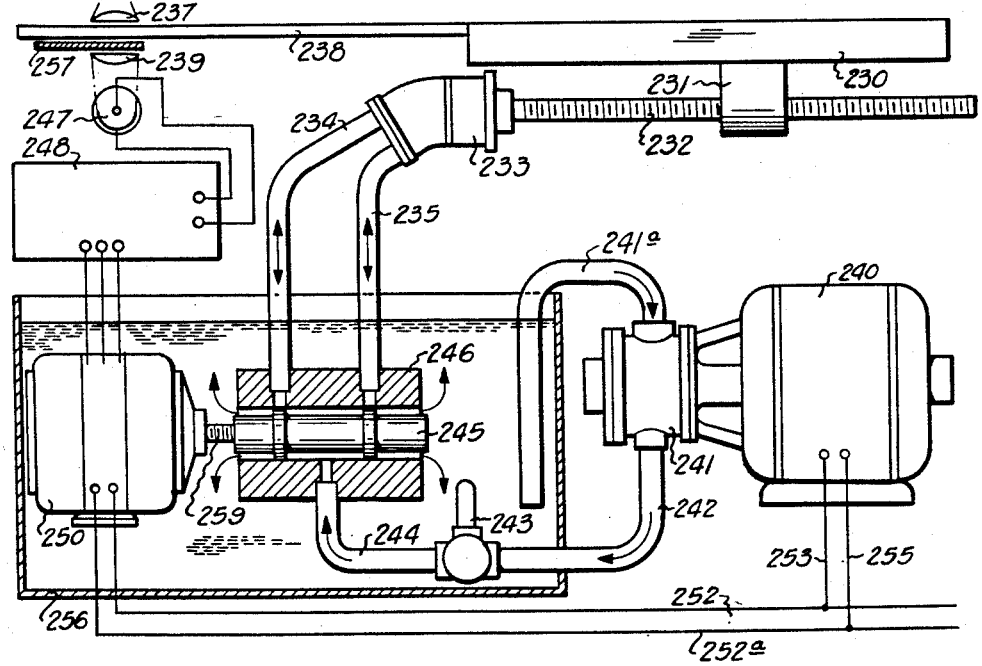
FIG_30_
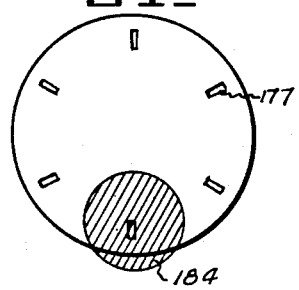
FIG_31_
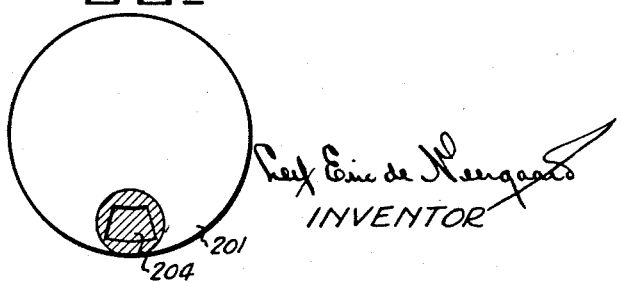
FIG_32_

Feb. 17, 1953 — L. E. DE NEERGAARD — 2,628,539
METHOD AND MEANS FOR RECORDING AND REPRODUCING DISPLACEMENTS
Filed Jan. 4, 1945 — 11 Sheets-Sheet 9
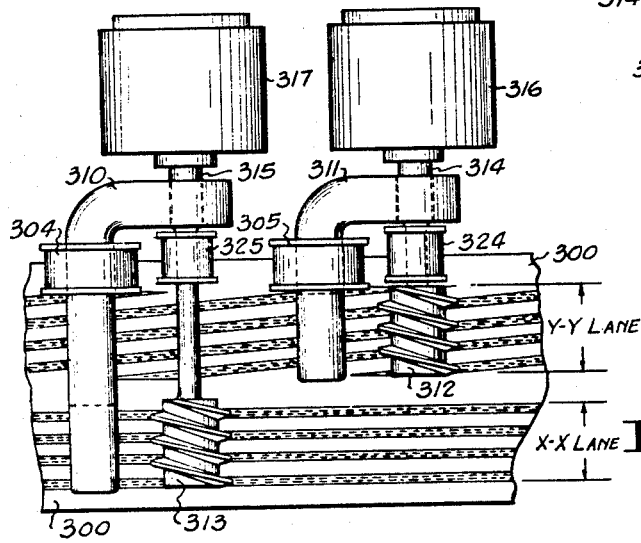
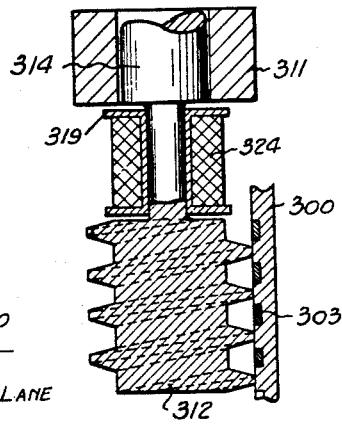
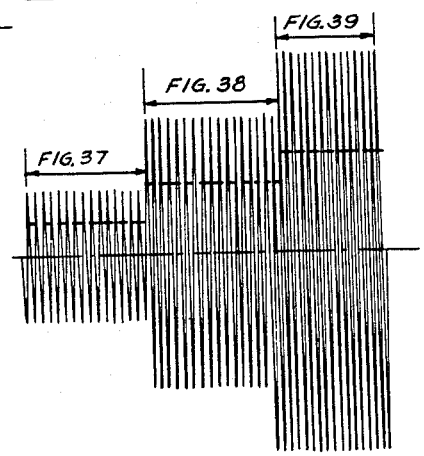
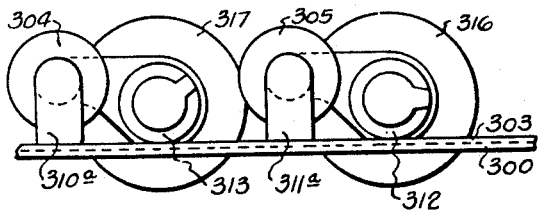
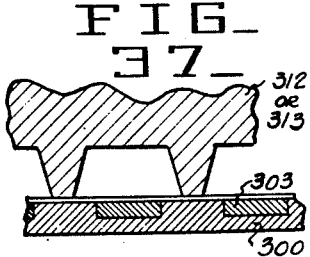
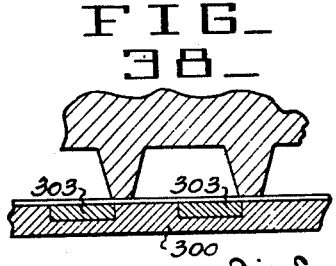
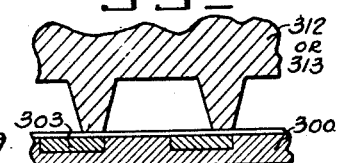
INVENTOR
Leif Eric de Neergaard Feb. 17, 1953 L. E. DE NEERGAARD 2,628,539
METHOD AND MEANS FOR RECORDING AND
REPRODUCING DISPLACEMENTS
Filed Jan. 4, 1945 11 Sheets-Sheet 10
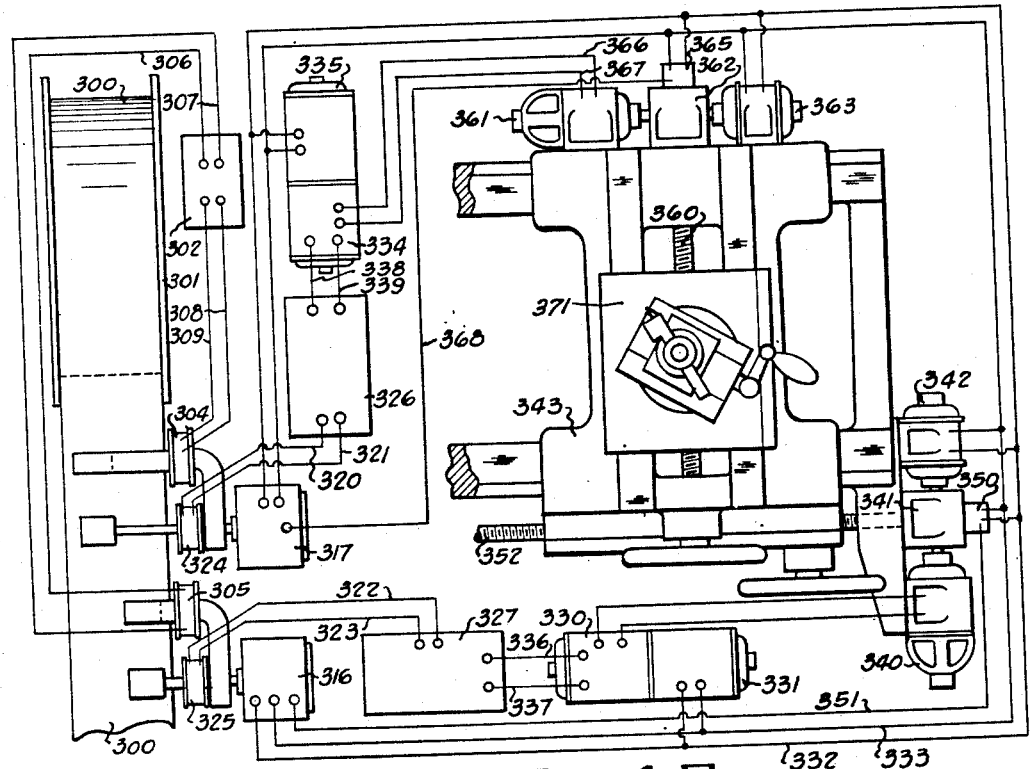
FIG_40_
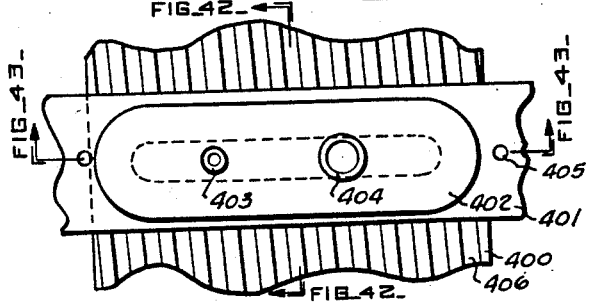
FIG_41_
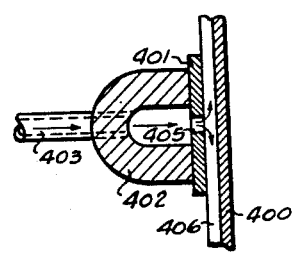
FIG_42_
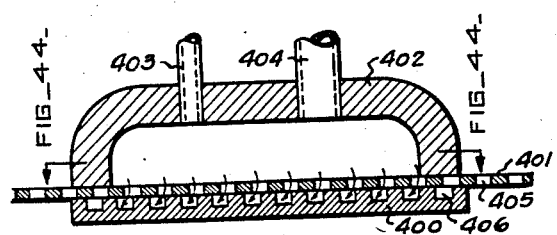
FIG_43_
Leif Eric de Neergaard
INVENTOR

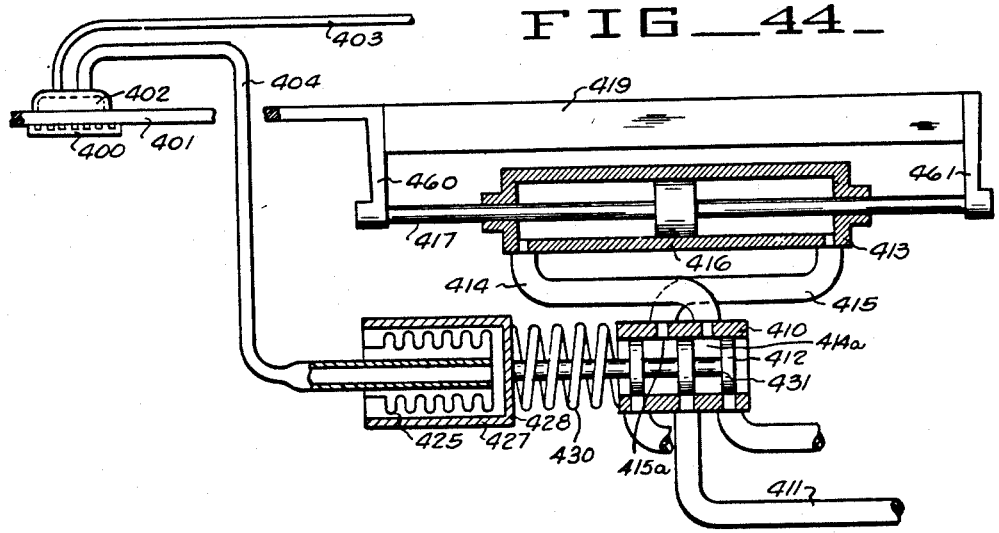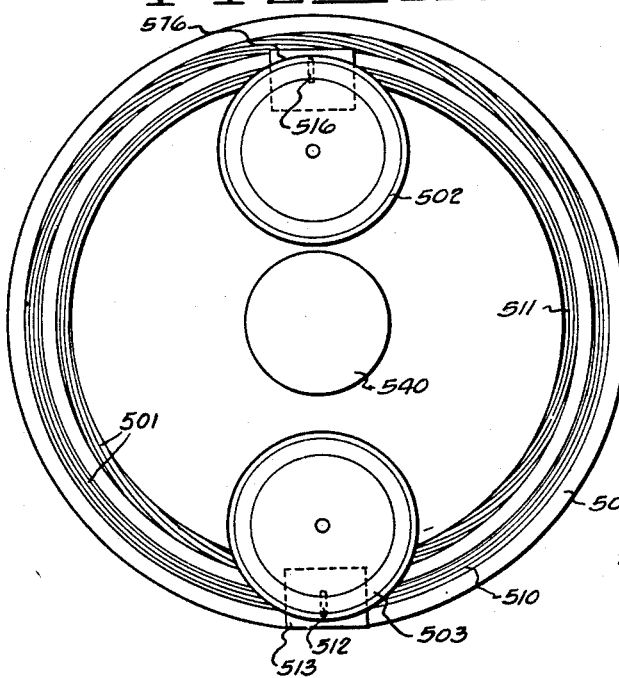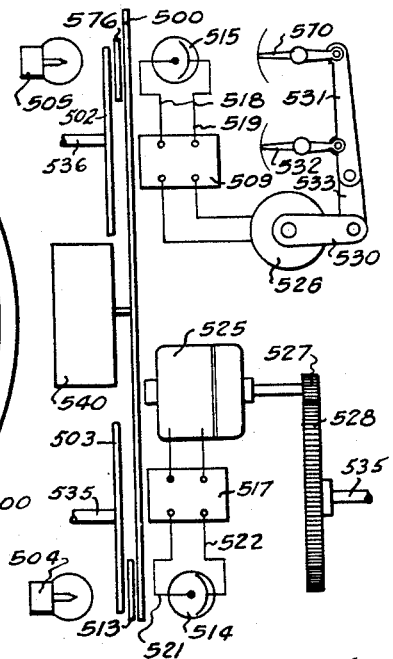

Patented Feb. 17, 1953

2,628,539

UNITED STATES PATENT OFFICE 2,628,539

METHOD AND MEANS FOR RECORDING AND REPRODUCING DISPLACEMENTS

Leif Eric de Neergaard, Manhasset, N. Y.

Application January 4, 1945, Serial No. 571,338

31 Claims. (Cl. 90—13.5)

This invention relates to systems for the control of the displacements of various members along preselected paths or in preselected sequence and particularly to the controlled displacement of members used in the fabricating or processing of various materials.

The invention still more particularly relates to the automatic control of a machine to perform a cycle of operation during which the tool and material being machined or otherwise fabricated are moved relative to each other through a series of predetermined movements in a preselected sequence.

An object of the invention is to control the different motions of work-to-tool or tool-to-work members of fabricating machines so that the material being fabricated will be shaped, cut or otherwise formed or worked in exact duplication of a two or three-dimensional shape or body.

Another object is to simultaneously resolve the complicated movements of machine tool cycles into separate displacements lying in a system of coordinates and to separately impress the magnitude of each displacement on a control record which can be used to reproduce the original component movements.

Yet another object of this invention is to cause a lane or track, extending substantially along the length of a control record such as a reel of tape or film, to be displaced at right angles to the length of the control member in a direction and amount identical to the magnitude and direction of displacement of a machine-tool element such as a lathe-carriage or slide.

Still another object of the invention is the automatic control of valves, gates, feeders, burners and similar devices whereby control-elements of said devices are displaced in a preselected sequential manner to cause desired physical or chemical changes to take place in a material or substance in a desired chronological order.

Another object of the invention is to allow the timing of relative movements, between the work and tool supports of a machine-tool or other fabricating device, defining a complicated cycle, to be instantaneously adjusted by manual or automatic means by controlling the rate of displacement of a control-record.

Yet another object is to provide an automatic control system which allows the complete stoppage of the fabricating machine at any point in a complicated cycle, necessitated by tool breakage or other cause, without any loss of cyclic control or accuracy due to time discontinuity.

Yet another object of this invention is to provide an automatic control system which allows an operator to substantially instantaneously cause the successive plural movements of work and tool supporting-members of a fabricating machine, which define a complicated fabricating cycle, to be reversed in direction and succession by merely reversing the direction that a control-record is normally displaced.

Another object is to provide a control system for a fabricating-machine in which the use of cams, templates and similar displacement-constraining-members are entirely eliminated in causing work and tool supporting-members to be displaced as they define a complicated fabricating-machine cycle.

Another object of the invention is the complete elimination of templates, forms and other contour-controlling members in the automatic control of complicated machine-tool cycles, thus allowing the overall physical dimensions of contouring-machines to be reduced or, under certain conditions, saving valuable floor space in fabricating shops.

Yet another object is to simultaneously measure and record the displacement of a stylus, template-follower or similar member in relation to the two normal axes of a two-dimensional Cartesian coordinate system.

Another object is to simultaneously measure and record the magnitude of the displacements of each successive position, occupied by a point traversing a spatial path, relative to the normal axes of a three-dimensional Cartesian coordinate system.

Still another object is to continuously measure the successive displacements of a point in relation to the normal axes of a three-dimensional Cartesian coordinate system and to simultaneously record the direction and magnitude of each of the displacements on separate flux-transmissive lanes or tracks impressed along the length of a motion-picture type film or similar control record.

Another object is the provision of a control system, adapted to automatically define complicated machine-tool cycles, governed by a control-record which, in many instances, may be completely prepared in a few moments and at an extremely low cost.

Another object of this invention is to provide a control-record, no larger in many instances than a reel of 16 mm. motion-picture film which is capable of completely controlling complicated machine-tool cycles lasting upward to an hour or more.

Another object is to provide a control-system allowing a certain, complicated machine-tool cycle of a machine-tool to be changed in a few seconds to a completely different cycle by merely substituting one control-record for another.

Another object of the invention is to provide a system of permanently recording linear or angular displacements in which the recording takes the form of equidistant, parallel, flux-transmissive lanes continuously impressed longitudinally to the length of a control record such as motion-picture type photographic film.

A further object is to provide a species of flux-gate consisting of a control-record and a displacement-measuring member whose coaction continuously controls flux-magnitude.

Another object is to continually govern the degree of opening of separate flux-gates in response to the displacements of recorded flux-transmissive channels or lanes perpendicular to their lengths so that the tool and work-supports of a machine tool are moved relative to one another through a series of movements and in a predetermined sequence in response to the magnitudes of flux being continually governed by the flux-gates from instant to instant.

Another object is to provide a novel control system adapted to define complicated machine-tool cycles, involving relative motions, between the work and tool supports of a machine-tool along a plurality of paths, in response to the degree of openings of a plurality of flux valves controlled from instant to instant by a control-record.

Another object of this invention is to impress parallel flux-transmissive tracks along the length of a control-record while simultaneously causing displacement of the tracks perpendicular to the length of the control record's length in an amount and direction proportional to the movement of a displacement-measuring member.

Yet another object is to provide a very simple control system which is preeminently suited to control the rate and direction of rotation of large power-elements such as direct-current motors, alternating-current motors, hydraulic-motors, hydraulic and pneumatic-cylinders, variable speed-reducers, turbines and the like, which are used to power control displacements between the tool and work supports of a fabricating-machine as they define a complicated fabricating-cycle.

Still another object is to provide a system whose control record, such as a motion-picture type film, has such a low rate of linear-displacement that, in many instances, the displacement of the control-record is only four or five times that of work and tool supporting members of a machine-tool, thus making for low cost and long life of the control record.

Another object is to provide an automatic cyclic control system for machine-tools which allows absolutely continuous, stepless displacements to be imparted to the various work and tool supports, as they define a complicated two or three-dimensional, displacement-cycle, thus eliminating vibration to the machine-tool due to discontinuous displacement and producing finely-finished, stepless contour or surfaces in the work being fabricated.

Another object of the invention is to continuously and simultaneously control the rate and direction of displacements of one or more machine-tool slidable-members through a predetermined operational cycle in response to flux-variations continuously governed by the lateral displacement of flux-transmissive lanes impressed longitudinally on a control-record.

Another object of the invention is to represent each of the three Cartesian coordinates of any point on the enclosing surface of a three-dimensional object by imparting separate, perpendicular displacements to a set of recorded flux-transmissive channels which, when reproduced, can accurately and simultaneously position a member in automatic response to the recorded perpendicular displacements.

Another object of the invention is to continuously represent the movement of a point traversing a spatial path by continuously representing each of the three Cartesian coordinates as a separate perpendicular displacement of flux-transmissive channels which, when reproduced, will control the movement of a member in exact reproduction of the spatial path in response to the perpendicular displacements of the channels.

Another object is to accurately control the automatic displacement of work and tool supporting members of fabricating-machines through a complicated cycle by the continuous regulation of fluid, magnetic or electromagnetic flux, responsive to the displacement of flux-transmissive channels impressed upon and perpendicular to the direction of movement of a control-member.

Still another object is to translate the configurations of two-dimensional outlines, shapes, forms or templates into recorded displacements of flux-transmissive channels which, upon reproduction, govern fluid, magnetic or electromagnetic flux in response to the direction and magnitude of the reproduced displacements to accurately govern the movement of work and tool supporting members through a spatial path identical to the configuration of the outline.

Still another object of the invention is to translate the configurations or surfaces of two or three-dimensional outlines or solids into a series of recorded displacements, which upon reproduction, can control the relative displacements of machine-tool work and tool supports to pass through movements which, as desired, are either a magnification or reduction of the displacements of the original outline or solid.

In the drawings:

Figure 1 illustrates one embodiment of a displacement-recorder in its simplest form.

Figure 2 is an elevation of Figure 1.

Figure 3 is an enlarged cross-section taken through Figure 1.

Figure 4 is cross-section taken through Figure 1.

Figure 5 is a cross-section through one species of control-record.

Figure 6 is a schematic drawing illustrating a certain processing of one species of control record.

Figure 7 is a view taken in plan of one species of 2-dimensional displacement-recorder.

Figure 8 is an elevation of Figure 7.

Figure 9 is another elevation of Figure 7.

Figure 10 illustrates in plan some of the essentials of the displacement-recorder illustrated by Figure 7.

Figure 11 illustrates the optical system used by the recorder shown in Figure 7.

Figure 12 illustrates in elevation certain elements shown in plan in Figure 10.

Figure 13 is another elevation of Figure 10.

Figure 14 is a perspective of one species of three dimensional displacement-recorder.

Figure 15 illustrates in large scale certain elements used in the device shown in Figure 14.

Figure 16 shows the optical system used in the device illustrated by Figure 14.

Figure 17 is an illustration of a section of control record.

Figure 18 is yet another illustration of the record shown in Figure 17.

Figure 19 is a plan view of a fabricating device whose two-dimensional displacements are automatically controlled by the instant invention.

Figure 20 is an elevation of Figure 19.

Figure 21 is another elevation of Figure 19.

Figure 22 illustrates certain elements essential to the operation of the fabricating device illustrated by Figure 19.

Figure 23 is a schematic drawing of an electronic amplifier used by the device illustrated by Figure 19 and also used in several other species of the invention.

Figure 24 is a large-scale cross-section taken through certain elements of the device illustrated by Figure 19.

Figure 25 is a schematic illustration in large-scale of a section of a control record under certain conditions.

Figure 26 is still another view of the control record illustrated by Figure 25.

Figure 27 is a schematic outline of one type of servo-mechanism.

Figure 28 is a schematic illustration of a second type of servo-mechanism.

Figure 29 illustrates a third species of servo-mechanism.

Figure 30 illustrates a fourth species of servo-mechanism.

Figure 31 illustrates a disc utilized by the device illustrated by Figure 27.

Figure 32 illustrates a member used by the system shown in Figure 28.

Figure 33 illustrates certain elements used in conjunction with the servo-mechanism shown in Figure 40.

Figure 34 is a cross-section taken through certain elements illustrated by Figure 33.

Figure 35 is another view of the devices illustrated by Figure 33.

Figure 36 is a graph which is intended to show the amplitude of certain voltages used in the servo-mechanism system illustrated by Figure 40.

Figure 37 illustrates the relative positioning between a certain flux pick-up and one species of control-record.

Figure 38 is another illustration showing the elements, illustrated by Figure 37 in a different relative position.

Figure 39 is another illustration of the elements shown in Figures 37 and 38.

Figure 40 illustrates a fifth species of servo-mechanism used in conjunction with an engine-lathe.

Figure 41 shows a section of control-record used in conjunction with a certain species of pneumatic pickup.

Figure 42 is a cross-section taken through Figure 41.

Figure 43 is also a cross-section taken through Figure 41.

Figure 44 illustrates one species of pneumatic controlled servo-mechanism.

Figure 45 illustrates a control system using a circular control disc upon which certain flux transmissive lanes have been impressed and which, upon reproduction are capable of controlling valves, louvers and similar members in a sequential manner.

Figure 46 illustrates certain details of the control device illustrated by Figure 45.

Figure 1 illustrates a displacement-recorder which may be used to continuously measure a single, linear displacement and cause the direction and magnitude of the displacement to be permanently recorded on a control-record. A meter-bar 1 is slidably supported by the two bearings, 2 and 3. The right-hand end of the meter-bar terminates in a dependent stylus 4. The cutter-bar is prevented from rotating by a key way (not shown) extending along its length and a key (not shown) integral to one of the bearings.

The meter-bar is preferably made from steel, preferably having a substantial chrome-plated skin for wear-resistance. A plurality of identical cutting-teeth 5, extend substantially along the length of the meter-bar 1 which may have the rack-form illustrated in large scale, in Figure 3 or may be similar to the basic racks of the 14½ degree or 20 degree full-depth involute or other system. Figure 4 is a cross-section through the meter-bar, and clearly illustrates that each of the cutting-teeth 5, are shaped similarly to planar or shaper cutting-tools. The pitch of the cutting-teeth is constant and will be taken to be, for purposes of illustration, exactly 25 teeth per inch.

A strip of transparent material, preferably a plastic which is a polymerized derivative of methacrylic acid such as "Lucite" or "Plexiglas," serves as a control-record 6, Figures 1, 2, 3, 4 and 5. The width of this control-record will be taken to be .500" wide, its thickness .040", while its length may be ten, a hundred or more feet in length, dependent upon the length of the cycle of linear-displacements of the stylus 4.

The control-record 6, is continuously displaced perpendicular to the length of the meter-bar and in the direction indicated by the arrow, Figure 1. The rate of linear-displacement is held constant by a control-record driving means which, although not shown, will be understood to be similar to the reel-drive of a motion-picture, film-reeling device.

The rate of displacement of the control-record should be held at preferably 5 times the highest rate at which the stylus 4 is moved. Therefore, the control-record will be constantly moved at the rate of 50 inches per minute if the maximum rate of displacement of the stylus does not exceed 10 inches per minute.

The plastic strip, constituting the control-record, is continuously and positively drawn against the cutting teeth 5, integral with the meter-bar 1, causing a plurality of identical, equidistant grooves to be simultaneously cut on one surface of the strip. These grooves will be generated in exact parallelism with the edges of the plastic-strip at the instants when the meter-bar is static.

If the meter-bar is moved from right to left (as illustrated by Figure 1) at the rate of exactly 10 inches per minute, the angle of displacement of the generated grooves to the parallel edges of the plastic strip would be: 10/50=.2000=tangent of 11°—19'. Conversely, opposite movement of the meter-bar at the same rate will cause the grooves to be oppositely displaced at the same angle of 11°—19'. Therefor, movement of the meter-bar from left to right causes the generated or cut grooves to be displaced or skewed towards the right-hand edge of the control-record while opposite displacement of the meter-bar causes the grooves to be oppositely displaced towards the left-hand edge of the control-record.

Any rate of displacement of the meter bar produces a corresponding deflection to be imparted to the grooves so that the direction and magnitude of angular displacement of the grooves, measured in relation to the length of the control-record, becomes a precise record of the rate and direction of movement of the stylus and meter-bar from instant to instant.

Figure 6 illustrates, in a schematic manner, further processing of the plastic-strip after having the equidistant grooves generated along its length by the cutting action of the meter-bar. As indicated, the plastic-strip, constituting the control-record, is drawn from right to left. As the strip is continuously advanced under the hopper 7, finely comminuted pigment is delivered by gravity from the hopper to the grooved-surface of the plastic-strip, completely filling the grooves. The strip is then advanced to a stationary plow 8, which shears off any excess pigment lying on the ungrooved surfaces of the plastic strip. The grooves are thus filled with dense, opaque powder while the intervening lands or surfaces, lying between the powder-filled grooves, are perfectly clean to offer maximum transmission to light-flux.

The last operation is to continuously apply a very thin, tough, transparent plastic-strip 9, to the upper-surface of the control-record and thus permanently seal the opaque pigment in the grooves. "Cellophane" tape having one tacky surface may be used for this purpose. As indicated, the thin protecting tape may be applied under pressure by the action of a presser-roll 9a, bearing downwardly towards the plate 10, which slidably supports the control record as it is being grooved.

Figures 7, 8 and 9 illustrate one species of two-dimensional displacement-recorder. A flat metal base 12, whose upper surface 17, is ground to afford a perfect plane-surface, has two, upwardly extending, integral brackets 13 and 14a, which serve as rigid supports to a longitudinal-support 14. This longitudinal-support is preferably a seamless steel tube of circular cross-section. Its surface is highly finished and polished and should have a high degree of wear-resistance. The longitudinal-support is so positioned that its axis is in exact parallelism with the plane-surface of the base 12.

A boom 16, also preferably of the same material, finish and cross-section as the longitudinal-support 14, extends outwardly from that support. The axis of the boom is always maintained at an angle of exactly 90 degrees to the axis of the longitudinal-support and in precise parallelism with the plane-surface 17 of the base 12. One end of the boom is integrally fastened to a T-member 18. The horizontal section of the T is carefully bored and fitted with two sleeves of bronze or similar bearing material which serve as substantially frictionless supports to the boom's displacement along the length of the longitudinal-support. A key-way extending the length of the longitudinal-support and a co-operating key, integral with the T 18, may be provided to maintain exact parallelism between the axis of the boom and the plane-surface 17.

A pulley 19, preferably journaled on ball-bearings, is rotatably supported at the outward end of the boom. Two smaller pulleys 20 and 21, similarly journaled, are mounted on the T-member 18. The three pulleys are in the same horizontal plane. A flexible, lateral meter-ribbon 22, in the form of an endless-belt, is supported by the three pulleys. The meter-ribbon is preferably made of Invar, selected for its extremely low co-efficient of thermal-expansion. The dimensions of the ribbon will be assumed to be, for purposes of description, some .250 inch wide by .005 inch thick. The metal ribbon is kept in continuous tension by a compression spring carried inside the boom which constantly presses the support of the large pulley 19 in a direction parallel to the axis of the boom and in a direction opposite to the T 18. A cross-head 13, is slidably supported by the boom. A key and key-way, similar to the key and key-way in the longitudinal support and T 18, are used to prevent rotation of the cross-head which is bored and fitted with bronze bearings to allow frictionless displacement of the cross-head along the length of the boom. A stylus 24, extends downwardly from a bracket 23a integral with the cross-head. The stylus is rigidly clamped in a vertical position in the bracket 23a. The stylus may either be equipt with a small roller or be brought to a sharp, hardened-point as shown in Figures 7 and 8.

A small, upwardly-extending bracket 34, integral with the cross-head, is securely fastened to one strand of the lateral meter-ribbon. It should be noted, due to the position of the centers of the pulleys 19 and 21, that the strand, fastened to the bracket 34, is in exact parallelism with the axis of the boom.

An upward-extending bracket 25, Figures 8, 9, 12 and 13 and two spaced brackets 26 and 27, all integral with the T-member 18, serve as supports for an upper storage-reel 28 and a lower drive-reel 29. These reels may be considered identical to reels upon which motion-picture film is wound. The reels are mounted on conventional anti-friction bearings. The lower reel is preferably driven by means of a small alternating-current motor 30, which serves to continuously drive the film 36, downwardly as it is unreeled from the storage-reel.

A longitudinal meter-ribbon 31, made of Invar is rigidly supported in parallelism with the axis of the longitudinal-support 14. Two supports 32 and 33, integral with the brackets 13 and 14a, serve to rigidly support the meter-ribbon 31. A tensioning device, such as a threaded take-up in one of the supports 32 or 33, may be provided to hold the meter-ribbon in tension. Like the lateral meter-ribbon, the longitudinal meter ribbon will be assumed to be .005" thick by .250" wide.

A series of equidistant apertures 35, extend along the center of the longitudinal meter-ribbon 31. Identical apertures are also cut through that section of the lateral meter-ribbon 22, which passes across the face of the film 36, as the cross-head is moved through its maximum displacement from one end of the boom to the other.

The pitch of the apertures 35, will, for purposes of description, be assumed to be exactly .040" while their dimensions are precisely .020" by .020". These square apertures should be preferably punched through the Invar ribbon stock. Their spacing should be very accurately maintained since the accuracy of the complete displacement-recorder is dependent upon their locationing. Also it is essential that the edges of each aperture be completely free of burrs or roughness and that their dimensions be maintained within very close limits.

A film-support 37, of the shape outlined by Figure 13, preferably polished stainless-steel of .005" to .008" thickness, serves as a slidable support for the downwardly advanced photographic-film 36. Two staggered apertures, 38 and 39, Figure 12, are cut through the film-support 37. Aperture 38, is so positioned that it is in exact register with the plural apertures cut through the longitudinal meter-ribbon 31 while aperture 39 is similarly positioned in relation to the lateral meter-ribbon 22. Each aperture 38 and 39, is exactly .020" wide by .160" long.

Figure 11 illustrates an optical system used in conjunction with the displacement-recorder illustrated by Figures 7 to 13. The flux from two filament-type, projection-lamps 40 and 41, preferably receiving their energy from a direct-current source, is collected by the two, similar condensing-systems consisting of the lens 42, 43, 44 and 45 to form two, concentrated parallel-light pencils, which fall upon the opaque stop 46. Two apertures, 47 and 48, identical in size and relative positioning to the two apertures 38 and 39, Figure 12, are cut through the stop 46. The function of the two apertures 47 and 48, is to stop down the parallel rays of flux into two light-pencils of rectangular cross-section in precise coincidence with the two apertures 38 and 39, cut through the film-support 37. It will be understood that the meter-ribbon apertures 35, have been purposely shown out of scale in Figures 12 and 13 for clarity of illustration. Figure 11 illustrates the fact that the lateral and longitudinal meter-ribbons, 22 and 31, are maintained so that they lightly bear against the smooth, polished inner-surface of the film-support 37. Since the surfaces of the Invar meter-ribbons are also very smooth, practically no friction results when they are horizontally-displaced during displacement-recording operations. The film-support serves as a means for definitely separating the ribbons from the emulsive surface of the film by .005" or by whatever thickness the film-support may be.

Functioning of the displacement recorder, whose various essential elements have been just discussed, will now be described. A template 50, of the outline indicated in Figure 7, is temporarily bolted or otherwise rigidly fastened to the plane-surface 17, of the displacement recorder base 12. The template may be made of fibre, plywood, plastic or metal dependent upon the accuracy required. For the highest type of accuracy a metal template some $\frac{1}{32}$ or $\frac{1}{16}$ of an inch thick should be preferably used.

The storage reel 29, is loaded with motion-picture type, photographic-film 36. The film, which is especially selected for the high resolving power of its emulsion, is downwardly displaced in response to the rotation of the motor 30, at a constant linear-rate approximately 5 times greater than the highest rate at which the stylus is manually moved about the configuration of the template 50. Therefore, if the maximum rate, at which stylus displacement occurs is 20" per minute, the rate of displacement of the film 36 would be 100" per minute, while a stylus displacement of 100" per minute would call for the film to be moved 500" per minute, etc.

The cross-head would be manually moved outwardly from the position occupied in Figure 7, while the boom would be simultaneously displaced from left to right until the tip of the stylus 24, contacted the corner of the template 50, at "A" which is the starting point of the displacement-recording cycle. The motor 30, is energized to continuously draw the photographic-film downward at a constant rate which, for purposes of description, will be assumed to be 100" per minute. The filaments of the lamps 40 and 41, Figure 11 are simultaneously lighted.

The stylus 24 is manually displaced from points "A" to "B" along the template's edge which is parallel to the longitudinal support 14. Since the complete recording device, consisting of the optical system, the reels, the motor and the film, is mounted on the T-member 18, the movement of the boom causes the film recorder to be moved from left to right.

Since the pitch of the apertures is .040", exactly 25 apertures 35, will pass at right angles to the length of the film for each inch of the boom's displacement. The movement of the apertures will be from right to left (opposite to the direction of the boom's movement) in relation to the film. If the rate of film movement is exactly 100 inches per minute, the maximum rate, of stylus' displacement, as stated, preferably would be limited to one-fifth of the film speed or 20" per minute.

As each aperture 35, cut along the length of the longitudinal meter-ribbon 31, comes into the zone bounded by the edges of the aperture 38, Figure 12, light-flux, collected by the condensing-lenses 42 and 43, is caused to fall upon the light-sensitive surface of the downwardly-moving photographic-film. Since the length of this aperture is, as stated .160" and the pitch of the apertures 35, is .040", exactly 4 of these apertures will be contained within the boundary edges of aperture 38, at any instant.

In this manner four, parallel, equidistant pencils of light, each .020" in cross-section are caused to continuously trace the displacement of the longitudinal meter-ribbon on the photosensitive surface of the film 36. Each of the 4 traces, photographed on the film, are separated by unexposed areas whose widths are identical to the .020" wide exposed traces or channels.

The stylus, upon being displaced to point "B" on the template 50, Figure 7, is displaced towards point "C." Longitudinal movement of the boom will be zero, while the stylus-head 23, integral with the stylus, will be displaced towards the longitudinal support 14, causing movement of the strands of the lateral meter-ribbon in a clock-wise direction when viewed in plan. In this manner the lateral meter-ribbon 22, will be displaced from right to left across the film 36, at a rate identical to the rate of displacement of the stylus as it is moved along the edge of the template from points "B" to "C."

The lateral meter-ribbon is used to continuously photographically impress four .020" wide lanes upon a separate area extending along the length of the photographic film, in a manner identical to the means by which longitudinal displacements are continuously and simultaneously recorded.

The edge of the template 50, Figure 7, between points "C" and "D" extends at an angle of 45° to the axis of the boom 16, and the longitudinal support 14. As the stylus 24, is moved along this edge it is longitudinally displaced parallel to the axis of the support 14, and laterally displaced parallel to the axis of the boom 16. The direction of the longitudinal displacement of the stylus is from right to left while its lateral displacement is towards the longitudinal-support 14. These longitudinal and lateral displacements are simultaneously recorded by causing perpendicular displacement to be imparted to two separate groups of parallel, photographed traces by amounts and in directions which are exact indices of the longitudinal and lateral displacements of the stylus.

Figures 17 and 18 illustrate sections of the film 36, sections of the longitudinal and lateral meter ribbons 22 and 31, and the film support 37. The positions of the above elements have been rotated through 90° in relation to their positions illustrated by Figure 12. These figures illustrate the displacement of the traces which have been exposed to the luminosity from the lamps 40 and 41. The exposed areas are illustrated by cross-hatching. Figure 17 illustrates that a stationary condition of the longitudinal meter-ribbon has caused zero perpendicular displacement to be imparted to the exposed traces, lying in the longitudinal-lane of the film. It further indicates that the lateral-control traces on the film have been displaced from right to left. Figure 18 indicates that the longitudinal meter-ribbon has been displaced from right to left while the lateral meter-ribbon has been displaced from left to right.

From the description of the operation of the device it will be seen its use enables an operator to continuously measure each successive point, occupied by a stylus as it is manually moved about the configuration of a complex template, in relation to the two normal axes of a Cartesian coordinate-system while simultaneously recording the direction and magnitude of the longitudinal and lateral components. Methods and means for the "play-back" of the film 36, to initiate the control of large power elements, whose rates and directions of movement, control the displacements of the work and tool supports of fabricating machines, will now be illustrated and described.

Figures 19, 20 and 21 show a species of two-dimensional displacement-reproducer which is specifically designed to accurately control the movement of a gas cutting torch in reproduction of the outline of the template 50, Figure 7, or any other desired outline. As will be later shown, the movement of the cutting torch is responsive to the "play-back" of a two-dimensional control record such as is illustrated by Figures 17 and 18. The displacement-reproducer, Figures 19 and 20 and 21 are so similar that with minor modifications the displacement-recorder can be used interchangeably as a displacement-reproducer. The modifications are: the addition to the displacement-recorder, of two gear-racks, two motor-driven speed-reducer units and two electronic amplifiers and the substitution of a gas cutting torch for the stylus 24, Figure 8. The gear-rack 106, Figure 20, extends, integral with and along the length of the boom 105 and is so positioned that the faces of the teeth are vertical. Figure 24 is a cross-section taken through the boom, gear-rack and cross-head 111. A gear rack 107, is similarily affixed to the underside of the longitudinal member 108. A small, motor-driven speed-reducer 109, is rigidly fastened to a dependent bracket 110, Figure 24, which is integral to a cross-head 111. A pinion 112, whose pitch is identical to that of the gear-rack, is press-fitted on the slow-speed shaft 113, of the speed-reducer unit 109. The teeth of pinion 112, mesh with the teeth of the gear-rack 106. An identical speed-reducer unit 114, is rigidly supported by the T-member 18, in a manner similar to the support of the speed-reducer unit 109, shown by Figure 24. Figure 22 illustrates that the same optical elements, shown in Figure 11, are used by the displacement-reproducer. Lamps 40 and 41, Figure 11 although not shown in Figure 22 are also included.

The light-flux from the dual, condensing-lens systems, consisting of lenses 42, 43, 44 and 45, after being stopped-down by the apertures 47 and 48, cut through the stop 46, is projected through the multiple apertures 35, punched along the lengths of the longitudinal and lateral meter-ribbons 31 and 22, then passes through the apertures 38 and 39, in the film-support 37, to be finally projected through the transparent traces of the control-film 160, upon the light-sensitive areas of the two photo-tubes 120 and 121.

Figure 23 is a circuit-diagram of an electronic-amplifier used to amplify the feeble currents of one of the photo-tubes 120 or 121 and to control the direction and rate of angular displacement of the rotor 123, of a small reversing induction-motor with wound shaded-poles, such as are commonly used for driving valves, dampers or recording devices. The input to the motor-field 124, which is alternating-current, preferably of a standard frequency such as 50 or 60 cycles, runs as high as 25 watts at 115 volts. The motor-speed may be varied over a range of 4:1 in either direction, or a differential action may be obtained, the motor speed and direction varying according to the difference in the excitation of the shading-poles 125 and 126.

Each of the motor shading-pole windings, is connected to the primary 127 or 128 of a transformer, the secondary 133 or 134, of which is connected to the plate-filament circuit of a vacuum tube 129 or 130. The tube grid-circuits may be arranged in a number of ways, one of which is shown in Figure 23. The only requirement of the grid-input is that sufficient voltage be supplied to swing the grids from cut-off up to approximately zero-voltage. The field 124, of the motor is continuously excited from the alternating-current line 131, 132, and the wound shading poles 125 and 126, acting as transformer secondaries, have about 25 volts induced in them. This voltage is applied to the transformers and these, being of a high step-up ratio develop the plate-voltage for the vacuum tubes 129, 130 which are preferably a type "47," triode connected tube. If the grids are normally biased to cut-off, no plate current flows and the primaries 127, 128 of the transformers are of such a high impedance that insufficient current is drawn through the shading-poles 125, 126 to produce rotation of the rotor 123. When the grid-voltage conditions are changed so that one of the tubes is conducting, the primary-current, drawn from the shading-pole by the tube-load on the transformer, is large enough to cause full-speed operation of the motor in the desired direction. In normal use, such a motor is designed to be operated by short-circuiting one or the other of the shading-poles 125, 126. The plate-resistance of the tube, reflected into the primary-circuit by the transformer is low enough to constitute an effectual short-circuit of the shading-winding effecting the motor's operation.

Due to the poor regulation of the shading-pole winding, the voltage drops to about 6 volts when full current of 0.30 ampere is carried. This reduces the plate-voltage to about 100 volts and necessitates a slightly greater grid-voltage swing to obtain the desired plate-current of 20 milliamperes. The large drop in plate-voltage with current allows the use of higher than normal plate-voltages during the time the tube carries no current, without at the same time producing undue tube heating. The transformers have low-resistance primaries and are designed for low-magnetizing current. Several types of microphone to grid transformers give very good results. The main requirement is a low resistance primary, so that the effect of the circuit resistance will be largely determined by the reflected tube load and allow a large value of current to flow in the shading-pole circuit with the tube conducting. With the tube non-conducting, the impedance of the transformer must be high enough to prevent rotation of the motor-rotor 123 by the transformer magnetizing-current, flowing through the shading-coil.

The circuit, illustrated by Figure 23, is very sensitive, a one volt change in phototube-output being sufficient to change the motor from full speed in one direction to full speed in the other. At some value of voltage on the grid of the tube 136, which is preferably a type "57," the plate-currents of the two type "47" tubes will be equal and, the excitation of the two shading-poles 125 and 126 being equal, the motor will be at rest. If the "57" grid-voltage is changed slightly, the grid-voltages of the two tubes 129 and 130, are changed differentially and the current in one-shading pole is increased, the other decreased. The motor then rotates slowly in the direction of the stronger shading-pole. By larger changes of "57" tube grid-voltage, a greater speed may be attained or by a grid-voltage change in the opposite direction the motor may be reversed. A considerable change in sensitivity can be covered by changing the values of the plate-resistors 137 and 138 in the type "57" tube plate-circuit although a value of 250,000 ohms will be generally found to be satisfactory.

Two, reversing, induction, wound shaded-pole motors, whose control have been described and which are schematically illustrated in Figure 23, are separately mounted in the housing of the gear-reducer 109, and gear-reducer 114. The rotor-shaft of each motor is direct-connected to a gear-type speed-reducer, housed in each of the speed-reducer units 109 and 114. The voltage output of photo-tube 120, which receives its controlled luminosity from a longitudinal control lane, photographed along the length of the control film 160, is used to control the functioning of an amplifier similar to the one shown in Figure 23. The output of the photo-tube 121, is similarly used to control the functioning of a second similar amplifier in response to light variations controlled by a lateral control lane also impressed along the length of the control-record 160. The voltage-output of the photo-tube 120, controls the direction and rate of rotation of the pinion 112, mounted on the slow-speed shaft 113, of the speed-reducer 109, Figure 24. The voltage-output of the photo-tube 121 similarly controls the rotation of the second pinion (not shown), mounted integral to the slow-speed shaft of an identical speed-reducer unit 114. Since the teeth of the pinions, driven by the speed-reducers 109 and 114, are in mesh respectively with the teeth of the racks 106 and 107, movement of the boom 105, and movement of the cross-head 111, will be governed at all times by the magnitude of light-flux falling upon the photo-tubes 120 and 121 respectively.

Figures 25 and 26 illustrate a section of a control-film 150, and a broken length of meter-ribbon 151. Alternate opaque-tracks 153 and transparent-traces 154, which, collectively, make up a single control-lane are shown. In Figure 26, the opaque sections of the film have been cross-hatched for clarity. The direction of movement of the film 150, Figure 25, is downward in a vertical direction. The movement of the meter-ribbon 151, is perpendicular to the direction of the film's movement. It will be assumed that the widths of the transparent traces 154, are .020" that the dimensions of the apertures are .020" x .020" and that the apertures are located along the length of the meter-ribbon at a pitch of exactly .040". These figures are intended to illustrate that exactly one-half of each aperture's area is in register with the surface of a transparent trace. When this condition exists the width of the effective light-transmissive area of each aperture is reduced from .020" x .020" to .010" x .020". This relative position of the apertures 152, to the transparent traces 154, is the control point position of the flux-gate illustrated by Figures 25 and 26. The use of the term "control point" in this disclosure is intended to describe the above relative position of the apertures with their coacting traces. Another way of describing the control point is, "that position of the meter-ribbon in relation to the traces in which each aperture is exactly bisected by the edge of a transparent trace." In this manner when a flux gate is at its control point the areas of its flux-passages are at 50% of their maximum.

A right-hand movement of the meter-ribbon 151, from the control-point position, as illustrated by Figures 25 and 26, through a distance of 0.10" will cause the apertures 152, to coincide with the transparent traces 154. A similar .010" movement of the meter-ribbon 151, but in a left-hand direction from the control-point position, causes the apertures to register exactly with the .020" wide opaque areas 153, which separate the transparent traces 154. In the former case maximum light-flux is projected through the apertures and transparent traces while in the latter case zero light-flux is valved through the apertures and the opaque areas. Since a .010" right-hand displacement of the meter-ribbon from the control-point position of the flux gate, Figures 25 and 26, causes a 100% increase in the light-flux valved by the flux gate, it will be seen that any movement of the metal-ribbon 151 to the right of the control-point position causes a decrease in the magnitude of the valved light-flux in exact proportion to the meter-ribbon's movement. Therefore, a .001" right-hand displacement of the meter-ribbon from the control-point=10% increase in light-flux; a .003" displacement=a 30% light increase; a .0005" displacement=a 5% light increase etc., etc. Conversely any displacement of the meter-ribbon to the left of its control-point position, causes a corresponding decrease in the light-flux projected through and regulated by the flux-gate, Figures 25 and 26. There are some 14 or more transparent traces 154, Figures 25 and 26, photographed on the film 150, which with the opaque lanes 153, constitute a single control-lane. There are only 4 traces on the longitudinal control lane and a similar number on the lateral control lane which are jointly impressed along the length of the control-record 160, Figures 19, 21 and 22. However, the functioning of the flux-gate, illustrated by Figures 25 and 26, is identical to the operation of the longitudinal and lateral flux-gates used to control the gas-cutting torch, Figures 19, 21 and 22.

Since longitudinal movement of the boom 105, along the axes of the longitudinal member 108, Figures 19, 20, and 21 is controlled by rotation of the motor driven speed-reducer 114, it will be seen that the controlled movement of the boom is continuously governed by the magnitude of the flux being valved from instant to instant by the longitudinal flux-gate. In a similar manner the amount of light, falling upon the photo-tube 121, which is being continuously regulated by the lateral flux-gate, controls the rate and direction of lateral-movement of the cross-head 111, along the axis of the boom 105.

The luminosities of the lamps 40 and 41 are adjusted by manually-controlled rheostats (not shown) until the intensity of the light, falling upon the photo-tubes 120 and 121, is such that the rotors of the two shaded-pole motors are stationary when their controlling longitudinal and lateral flux-gates are in their exact control-point positions. This adjustment, obviously, is made with a control-record 160, in place, and at rest upon the reel-driving mechanism, since the transparent traces, impressed on the record's surface, cooperate with the two meter-ribbons to constitute the two flux-gates. Upon the film-driving motor 30, being energized, the control record 160, is drawn downwardly at a uniform rate. The flux-gates will remain in their control-point positions as long as the transparent traces are exactly parallel with the edges of the film upon which they are impressed.

Now assume that the transparent traces, constituting the lateral control lane, when viewed in the same position as Figure 12 (it being understood that the film-driving mechanism of the displacement recorder and reproducer are identical), are displaced slightly to the right in a direction perpendicular to the film's length. This movement of the traces in a right-hand direction, in relation to the cooperating apertures 35, cut in the lateral meter-ribbon 22, would cause (for purposes of description) more light to fall upon the photo-tube 121. The rotor of the shaded-pole motor, direct-connected to the speed reducer unit 109, Figures 20 and 24, would instantaneously respond to the increase in light-flux falling upon the photo-tube, and rotate in such a direction that the pinion 112, Figure 24, would be caused to rotate in a counter-clockwise direction. The cross-head 111, Figures 19, 20 and 24 would immediately be displaced along the axis of the boom 105, away from the longitudinal member 108. This displacement of the cross-head would be instantly communicated to the lateral meter-ribbon 22, causing that section of the ribbon, in contact with the film support 37, Figure 22, to be drawn from left to right by an amount identical with the cross-head's displacement. In this manner, the apertures 35, cut in the lateral meter-ribbon 22, will be moved in the same direction as the displacement of the traces, perpendicular to the film's edges. If the rate of the meter-ribbon's displacement is not as great as the rate at which the traces are being displaced to the right, the effective areas of the apertures will be increased to permit still more light to fall upon the photo-tube 121. This would be instantly reflected by a higher rate of rotation of the rotor of the motor, causing the cross-head to be moved at a higher speed towards the large-pulley end of the boom and causing the section of the meter-ribbon, in contact with the film-support 37, to be displaced at a higher velocity from left to right. The movement of the meter-ribbon would be accelerated until the rate of its displacement would exactly equal the rate of perpendicular displacement of the traces to the right.

If the angular displacement of the traces towards the right-hand edge of the control-film 160, gradually decreases until the traces are again parallel to the film's edges, the amount of light, projected through the cooperating-apertures 35, will decrease in exact response to the change in the perpendicular displacement of the traces, until the shaded-pole motor's rotor is brought to a standstill, when the control-point position of the flux-gate is again reached. Obviously, if the lateral traces are gradually deflected in a direction towards the left-hand edge of the control film or record 160, the intensity of the light falling upon the photo-tube 121, would be less than the amount admitted by the flux gate's control-point position. The electronic system would immediately respond to cause the motor to rotate in a direction opposite to that which it assumed when the traces were displaced to the right. This would, therefore, cause the pinion 112, Figure 24, to be rotated in a clock-wise direction (when viewed in plan) and thereby cause the cross-head 111, to be displaced towards the longitudinal-member 108. Since the electronic system, illustrated by Figure 23, is so sensitive that a one-volt change in the output of the photo-tube 121, will change the speed of the shaded-pole motor from full speed in one direction to full speed in the other, the increase or decrease of light-flux, continuously valved by the flux-gate, has only to be a very few percent above or below the value of the light-flux admitted by the flux-gate when it is in its control-point position to obtain similar motor speed-regulation.

Movement of the boom 105, along the axis of the longitudinal member 108, is controlled in a manner identical with that used in the automatic displacement of the cross-head 111, Figures 19, 20. The longitudinal traces are photographed along the longitudinal control-lane which lies parallel to the lateral control-lane. The longitudinal lane is adjacent to the left-hand edge of the control-record 160. Cooperation of the longitudinal traces with the apertures 35 cut along the length of the longitudinal meter-ribbon 31, causes the intensity of the light-flux from lamp 40, Figure 11, to be continuously regulated before it falls upon the light-sensitive area of the photo-tube 120, Figure 22.

By the use of the displacement-reproducer it will be seen that the tip of the gas-cutting torch 161 is caused, by the simultaneous controlled displacements of the boom 105 and the cross-head 111, to be displaced along a spatial path lying in a single-plane, which is identical in configuration to the outline of the template 50, Figure 7.

Figure 14 is a partial view taken in perspective, of the elements, essential to the operation of one species of three-dimensional displacement-recorder whose members are, in many respects, similar to the main members of the two-dimensional displacement-recorder just described. Therefore, although not shown, it will be understood the device illustrated by Figure 14, has a base and two upwardly-extending brackets similar to the base, Figure 7 and brackets 13 and 14a, to afford support to the longitudinal-member 60, whose axis is parallel to the horizontal plane-surface of the base. An outwardly-extending boom 61, slidably supports a cross-head 62, which is prevented from rotation about the boom by provision of a key-way 64, cut in the boom and a cooperating key, carried integral with the cross-head. The boom is slidably supported by the longitudinal-member. The axis of the boom is maintained parallel to the horizontal plane-surface of the base by means of a key secured to the T-end of the boom and sliding in the key-way 63, generated along the length of the longitudinal-member. A stylus 65, is slidably supported in a vertical position by the two brackets 67 and 68, integral with the stylus-head 62. The stylus may terminate at its lower end in a roller or a sharp hardened tip, as illustrated, and in a smooth spherical-knob at its upper end.

Three similar pinions separately mesh with three racks; pinion 69, meshing with the longitudinal-member's rack 70, pinion 71, meshing with the rack 72, generated along the boom's length, with the third pinion 73, meshing with the rack 74, cut along the length of the stylus 65. For purposes of description it will be assumed that the pinions have 16 teeth of exactly .0625" circumferential pitch. Their three co-acting racks 70, 72 and 74, are of identical pitch. The three pinions, therefore, pass through exactly one revolution for each inch that the pinions are rolled along their cooperating racks, since .0625" x 16=1.000". Pinion 69, is integrally mounted on the rotor-shaft of a generator 75. The motor-shaft of generator 76, similarly mounts the pinion 71, while pinion 73, is integral to the rotor-shaft of the generator 77.

The rotor of generator 75, is electrically connected to the rotor of motor 78, by three conductors 81, 82 and 83, similar connection is made between the rotors of generator 76 and motor 79 by conductors 84, 85, and 86 while the rotors of generator 77 and motor 80, are connected through the leads 87, 88 and 89. The six stator-windings of the three generators and their coacting motors are all energized with single-phase alternating-current of preferably a standard frequency from the same identical source. The representations of the two conductors, carrying this alternating-current are, for purposes of clarity, not shown in Figure 14.

Each generator and its electrically-cooperating motor, constitutes a self-synchronous remote-control: commonly known as "Selsyn," "Autosyn" or "Snychro-tie" systems. These devices are so commonly used to accurately transmit angular-motion between two or more remote devices which cannot be conveniently mechanically-interconnected, that it is not considered necessary to further describe their action. Suffice it to say that, by the use of this type of remote-control device, it is possible to cause the discs 90, 91 and 92, separately mounted on each of the rotor shafts of the motors, to reproduce any angular displacement of their cooperating generator's rotor-shaft.

The disc 90, is mounted integral to the rotor-shaft of the motor or "Selsyn" repeater 78, the disc 91, is similarly mounted on the rotor-shaft of the motor or repeater 79, while the third disc 92, is likewise mounted on the rotor-shaft of the motor 80.

In this manner a 1.000" displacement of the boom 61, parallel to the longitudinal-member 60, or parallel to the X—X axis of a three-dimensional Cartesian coordinate system, causes angular-displacement of the disc 90, through exactly 360°. A similar linear displacement of the cross-head 62, along the boom's length or parallel to the Y—Y axis of the three-dimensional coordinate system, causes a 360° rotation of the disc 91. Movement of the stylus 65, parallel to the Z—Z axis of a three-dimensional Cartesian coordinate system through 1.000" will cause a 360° angular displacement to be imparted to the disc 92. Obviously, the linear-displacement of either the boom, the stylus-head or the stylus will cause an angular displacement to be imparted to the cooperating discs, in amounts and directions exactly proportional to the linear-displacements.

By the use of "Selsyn" or similar systems for electrically transmitting mechanical motion it is feasible to locate the repeaters or motors 78, 79 and 80 and the discs 90, 91 and 92, many hundreds of feet, if desired, from the main mechanical elements of the three-dimensional displacement-recorder, illustrated by Figure 14. In some installations the use of flexible-shafting to accurately transmit rotation of the pinions 69, 71 and 73 to the discs 90, 91 and 92 may be substituted for the use of electrical "Selsyn" systems.

The three discs are identical and preferably made of thin optical glass or transparent plastic. One face of each disc is opaqued by having a coat of aluminum, copper or silver evaporated upon its surface, although a coating of certain opaque lacquers or enamels may be used. Material of the masking-coat is removed either by mechanical-working, etching, or by photo-engraving to form a three-thread spiral of the opaque masking coat. The configuration of the spiral 93, is clearly illustrated in Figure 15. The pitch of each spiral is such that it advances outwardly from the disc's center, a distance of exactly .1200" when displaced through 360° in a clock-wise direction. Since there are three spirals, the distance, measured radially between the centers of adjacent opaque spirals, is .040" while their widths are .020". The areas of the disc, lying between the spirals, are transparent and, therefore, light transmissive. The three motors 78, 79 and 80, and discs 90, 91 and 92 are preferably mounted in the staggered relationship to the stop-plate 94a and motion-picture type photographic-film 94, illustrated by Figure 14. Although not illustrated in the figure, it will be understood that the film-drive is similar to the drive illustrated in Figures 10, 12 and 13 and, therefore, consists of a storage reel, a drive reel, a drive-motor with speed-regulating control, to maintain a constancy of film movement, and a necessary light-tight enclosure for the enumerated elements.

Figure 15 illustrates a broken-section of the photographic-film 94, and a broken-section of the stop-plate 94a, as well as details of the disc 90, identical to the discs 91 and 92. Each of the discs is preferably separated from the plane-surface of the stop-plate by one or two-thousandths of an inch. The stop-plate is similarly separated from the light-sensitive surface of the film 94. An aperture 95, Figure 15, is cut through the stop-plate. Two similar apertures, although not illustrated in Figure 14 are provided to cooperate with disc 91 and disc 92 in a manner identical to the aperture coacting with disc 90. The width of each aperture is preferably the same as the width of an opaque spiral or .020" while its length is .1200".

Figure 16 illustrates the light-system used in conjunction with disc 90. Discs 91 and 92 have identical individual systems. The "Selsyn" repeater or motor 78, is shown with the disc 99, integrally mounted on one end of its rotor-shaft 96. The rays from a filament-type projection-lamp 102, preferably supplied from a direct-current source, are gathered by the two condensing-lenses 97 and 98, into a light-pencil of parallel rays. The light-pencil is stopped-down by the aperture 99, cut through the stop-plate 100, to a rectangular cross-section whose dimensions may be approximately .150" x .150" or greater. The light-pencil, upon striking the plane-surface of the mirror-block 101, is deflected at 90°, parallel to the axis of the rotor-shaft, towards and normal to the plane-surface of the disc 90. This pencil of concentrated light-flux coincides with the aperture 95, cut through the stop-plate 94a. By the use of the instrumentalities illustrated in Figure 16, three .020" wide parallel lanes are caused to be continuously photographed upon the light-sensitive surface of the film in response to the concentrated light-flux which passes through the transparent areas lying between the opaque spirals.

The width of the film 94, is divided into three, separate, ribbon-like areas which are parallel to one another and also to the film's edges. The left-hand lane, Figure 14, is the X—X lane upon which the displacement of the boom is recorded as it is moved parallel to the X—X axis of a three-dimensional system of Cartesian coordinates. The center-area, on the film, is the Y—Y lane, upon which displacements of the crosshead 61, are recorded as it is displaced parallel to the Y—Y axis of the coordinate-system, while the right-hand area is the Z—Z axis, since the various vertical displacements of the stylus are hereon impressed. Therefore, the direction and amount of each disc's angular displacement are continuous indices of the directions and amounts of movement of the stylus, in relation to the X—X, Y—Y, and Z—Z axes of a Cartesian coordinate system. A 1.000" displacement of the boom in one direction can be made to produce a 360° angular-movement of the disc 90, in a clockwise direction. Similar displacement of the boom but in opposite direction, would cause the disc to again be rotated but in a counterclockwise direction. Since the pitch of each opaque spiral, imprest on the disc is, as stated for illustrative purposes, exactly .1200" per revolution, the parallel transparent traces, photographed on the X—X lane of the film, will be displaced perpendicular to the length of the film a distance of exactly .120" per 1.000" displacement of the boom and in a direction controlled by the direction of the boom's movement.

Such a small perpendicular displacement of the X—X, Y—Y and Z—Z tracks, photographed along the film's length, in response to the various movements of the stylus may, as will later be shown, suffice to control the automatic displacements of some machine-tool members where great accuracy is unimportant. However, as will be later shown, the accuracy with which the movements of machine-tool members may be later automatically controlled by the "play back" of the film 94, is increased in proportion to the ratio of the perpendicular displacements of the photographed transparent traces to the linear-displacements of the boom, cross-head and stylus.

Substantially any ratio can be set up by either increasing the number of the spirals on the discs or, more preferably, by the use of a step-up gear-drive between the pinions 69, 71 and 73 and the "Selsyn" type generators 75, 76 and 77 respectively. With such an arrangement, for instance, pinion 69, would be mounted on a shaft integrally with a 100-tooth gear. A second pinion, having 12 teeth of the same pitch as the gear, would be press-fitted on the rotor-shaft of the generator 75. The teeth of this second pinion would mesh with the gear-teeth. Movement of the boom along the longitudinal member 60, through exactly 1.000", would cause pinion 69 and the 100-tooth gear to be rotated through exactly 1 revolution, in turn causing the 12-tooth pinion mounted on the rotor-shaft of generator 75, to be displaced through 100/12=8.333 revolutions, Therefore, a step-up of the rotation of the rotor-shaft whose ratio is 1:8.333 results. In turn, rotation of the disc 90, would be proportionally increased. In this manner, the movement of the transparent traces, perpendicular to their lengths would be exactly 1.000" and, therefore, proportional to the actual linear-displacement of the boom 61, since .1200 x 8.333=1.000", where .1200=the pitch/revolution of the spiral in inches.

By the use of the three-dimensional displacement-recorder, illustrated by Figures 14, 15 and 16, the displacements of each successive point, occupied by the tip of the stylus 65, as it is manually displaced along any path drawn on the surface of the three-dimensional solid 92, are separately measured normal to the three axes of a Cartesian coordinate-system and simultaneously recorded in such a manner that, as will later be shown, a machine tool's work and tool supporting-members can be guided to reproduce a spatial path, identical to that traced on the form 92, by the stylus 65.

The displacement-recorder, Figures 14 and 15 can, with certain modifications, be used to automatically control the displacements of a milling-machine or similar fabricating-tool, whose tool and work-supports are simultaneously moved normal to the axes of a three-dimensional Cartesian system of coordinates. The modifications would be quite similar to those made to the two-dimensional displacement recorder, Figures 7 to 13, in converting it to the two-dimensional displacement-reproducer, Figures 19 to 24. Three "Selsyn" generators similar to 75, 76 and 77, Figure 14, would be provided and angularly displaced in the same manner that they are displaced in Figure 14. For this purpose three-gear racks, similar to the racks 70, 72 and 74, would be arranged on the three slidable tool and work-supports of the milling-machine, so that relative displacements between the work and the cutter, parallel to the X—X, Y—Y and Z—Z axes of the system would cause the three generators to be rotated by proportional amounts. It will, of course, be understood that each of the press-fitted pinions are similar to pinions 69, 71 and 73. In this manner, any displacements of the slidable work-members of the milling-machine will be immediately reflected in the rotation of the proper spiral discs 90, 91 and 92 by amounts and directions proportional to the separate linear-movements of the slidable-members.

The three "Selsyn" generators, motivated by the movements of the milling machine, are, therefore, caused to impart suitable rotation to the three spiral-discs which, in cooperation with the X—X, Y—Y and Z—Z transparent traces on the film 94, Figures 14 and 15, constitute three separate flux-gates. Light, passing through the three separate flux-gates would be projected upon three photo-tubes, similar to tubes 120 and 121, Figure 22. The rate and directions of three power-units, similar, if desired, to the shaded-pole motors, used to rotate the speed-reducers 109, Figure 20, and 114, Figure 21, would be separately controlled by the magnitude of the light-flux, valved by the three photo-tubes. Obviously, three amplifiers, similar to the one illustrated by Figure 23, could be used to control the rotation of the three shaded-pole motors in response to the light-variations falling upon the photo-tubes. Each of the motors would be connected, preferably through gearing, to three lead-screws, by whose rotation the displacements of the work-and-tool supports of the milling machine would be controlled. In this manner the relative displacements between the milling-machine's cutter and the work would be controlled by the "play-back" of a control-film to instantly cause the work to be machined to the exact shape of the form 92, Figure 14 or to any other desired three-dimensional shape.

Up to this point the use of a shaded-pole motor to displace various slidable machine-tool members has been described. Unfortunately, the torque-output of such a motor is too low, in many cases, to rotate a lead-screw or other form of drive used to displace large, heavy slides, carriages, work-tables or similar machine-tool members. Figures 27, 28, 29 and 30, illustrate, in a schematic manner, four methods of controlling the displacements of such slidable members, in response to the displacements of photographed traces perpendicular to the length of a control-member such as a photographic film. The power units illustrated, can produce enough torque to control the linear-displacement of a slidable machine-tool member even though 5, 10 or even more horsepower is necessary.

In Figures 27, 28, 29 and 30, the use of a small speed-reducer driven by a shaded-pole motor is made to initiate the control of the large power units. These motor-driven speed-reducers will be considered identical to the speed-reducers 109, Figure 20 and 114, Figure 21. It will be understood, although not shown, that each speed-reducer 170, Figures 27, 28 and 29 is controlled from instant to instant by light-flux whose intensity is controlled by means of a flux-gate in a manner identical to the control of the speed reducers 109 and 114, Figures 20 and 21.

The use of a direct-current motor 171 is indicated in Figures 27, 28 and 29 to serve as the power unit, whose rotation is caused to produce linear displacement of a single slidable machine tool member (not shown). The field-windings and armature-windings of the motor, which is preferably shunt-wound, are supplied with direct-current which is rectified by the action of gaseous triodes. The triodes are supplied with alternating-current of preferably 60 or 50-cycle frequency from a power-line. The type of gaseous triode used to commutate and rectify the direct-current supply to the motor 171 is preferably a thyratron. By use of this type of tube the close, automatic speed-regulation of a suitable motor can be maintained over a speed range of 80:1, or more.

The cabinet 172, Figure 27, encloses a controlled rectifier containing two sets of thyratron tubes, which convert the alternating-current supplied to them by an anode transformer to direct-current. One set of these tubes supplies D. C. voltage for the armature of the shunt-wound motor 171, and the other supplies voltage to the motor's field. By varying the voltage output of these two rectifiers it is possible to control the operation of the motor. The output of the armature and field tubes is varied by a group of control-tubes which act as amplifiers of currents from the photo-tube 192 in the circuits illustrated in Figures 27 and 28 or by the reactance of a solenoid-winding 74, Figure 29.

When a thyratron is operated on alternating-voltage, the tube extinguishes near the end of the positive half-cycle, and the grid regains control without the use of special circuits for interrupting the anode-current. By controlling the time in the cycle at which the tube "fires," the grid can vary the average anode current. This type of control can be attained by varying the phase of the grid-voltage with respect to the anode-voltage. When, however, it is very important, as in an automatic machine-tool control, for the thyratron to fire at exactly the same point in succeeding cycles, it is often desirable to use a fixed negative grid-bias and fire the tube by means of a positive pulse of grid-voltage. This type of control has the advantages that the negative grid-voltage aids deionization and that the positive-ion bombardment of the grid, obtained with negative-bias, helps to remove emitting material deposited upon the grid.

Figure 27 illustrates a system in which the time in the cycle at which a thyratron fires is controlled by such a pulse of grid-voltage. The ratio of the speed-reduction of the speed-reducer 170, Figure 27, is quite high 250:1 or even more. The rotation of the low-speed shaft 175, is in the neighborhood of 10 R. P. M. when the shaded-pole motor, mounted within the housing of the speed-reducer, is revolving at its highest speed. At this motor-rate, the slow-speed shaft 175, rotates through an angle of 60° per second. A circular disc 176, of opaque material such as steel or Duralumin is mounted integral with the slow-speed shaft 175. Figure 31 illustrates this disc. Six equidistantly-spaced, similar apertures 177, are cut through the disc. The apertures are 1° or less in width while their lengths may be ½" or more. A second disc 178, identical to the first is integral with the rotor shaft 179, of a twelve-pole unidirectional synchronous motor 180. The motor-windings are supplied with alternating-current, preferably of commercial-frequency, through two conductors 181 and 182. Since the motor has twelve poles, the disc 178, will be continuously rotated at an angular-rate of 10 R. P. S. if the motor is energized with 60-cycle alternating-current. Therefore, each of the apertures 177, passes through an angle of exactly 60° per 360 electrical degrees of the current. The concentrated light-flux from a filament-type projection lamp 183, is projected upon the disc 176. This illuminated area 184, is illustrated by Figure 31.

In the discussion of the operation of the shaded-pole motors, which drive the two speed-reducers 109, Figure 20 and 114, Figure 21, it was shown that the rotors of these motors are stationary when the longitudinal and lateral control flux-gates are maintained in their control-point positions.

As shown, at the control-point position of a flux-gate, the total effective area of its passages, through which light-flux is projected is maintained at 50% of its maximum. Also it was shown that the motor rotates in one direction at a speed more or less proportional to the increase above 50% of the effective area, while a decrease in area below 50%, causes the motor to instantly rotate in the opposite direction and at a rate dependent upon the area's reduction. Therefore, the disc 176, will be stationary when the flux-gate is half-open; it will rotate slowly in one direction when the flux gate's area is more than 50% and will rotate in the opposite hand when the area is decreased below the control-point position.

Light-flux from the lamp 183, is collected by the convex-lens 190, which causes the flux to be converged on the light-sensitive areas of a photo-tube 192. The output of the photo-tube is led to the thyratron cabinet 172 through the conductors 191 and 193. Although not shown, it will be understood that there are mechanical stops which limit the arcuate movement of the disc to an angular-displacement of 15° in either direction from its position shown in Figure 31. Upon the filaments of the lamp being lit and the windings of the synchronous motor 180, being excited with 60-cycle current, a pulse of light will fall upon the photo-cell 191, each time that the apertures 177, in the rotating disc 178, register with the similar apertures cut through the normally stationary disc 176. The disc 178, is continuously rotated at 10 R. P. S. Therefore, 10 x 6 or 60 apertures will pass the single aperture 177 in the disc 176 in one second. If the apertures are 1° in width, the area of the cooperating apertures in the two discs 176 and 178, will be in register for 1/1800 second. In this manner an electrical impulse from the photo-tube 191, is impressed upon the control-grids of the thyratron tubes to control the time in the cycle at which the tubes fire. The thyratron is negatively-biased while the impulses from the photo-tube cause positive-pulses to be impressed on their grids. Since the power for the synchronous motor 180, is obtained from the same source from which the thyratrons receive their 60-cycle alternating-current, with the disc 176 stationary, the pulse will always occur at the same point on the 60-cycle alternating-current's time-axis. The voltage pulse, impressed on the thyratron grids, causes the thyratrons to conduct current until the tubes extinguish near the ends of their cycle. The rotation of the disc 176 through 1° in one direction causes the firing point of the thyratrons to be advanced 6 electrical degrees and causes the tubes to conduct for a proportionately greater part of their cycle. Opposite rotation of the disc causes the firing point of the thyratrons to be retarded by 6 electrical degrees per one degree displacement of the disk 176, with a corresponding reduction in current conduction.

Since the speed of the shunt-wound, direct-current motor 171, is regulated over a speed-range of 80:1 or more, it will be seen that rotation of the disc 176, through a total of 30° causes a phase-shift of the voltage-pulse through the necessary number of degrees. This, in turn, controls the speed of the motor 171, over its entire-range by regulating the firing point of the thyratrons from instant to instant.

In this manner, the displacement of a heavy, slidable-member, such as the carriage of a large lathe, can be continuously controlled in response to the light-flux being continuously valved through a flux-gate. It should be pointed out that the slightest deviation from the flux-gate's control-point position causes an instantaneous response in the system to either increase or decrease the rate of rotation of the motor 171. Since the mass of the disk 176, is very small it will be seen that an extremely small departure from the control-point position of the flux-gate, will be sufficient to cause the shaded-pole motor to instantaneously rotate the disk 176 in the proper correcting direction until the system is brought to balance. The shaded-pole motor is rotated only at such instants that the velocity of the slidable-member, being linearly displaced by the system, does not precisely match the velocity, at which the photographed traces are displaced perpendicular to the length of the control film or record.

Figure 28 illustrates a second circuit in which the rate of rotation of a powerful, shunt-wound direct-current motor 171b is supplied with rectified alternating-current from a thyratron system. As in the system just described, the output of the thyratrons is controlled by luminosity falling upon a photo-tube 192b. However, in the system illustrated by Figure 27, the timing of a pulse of light falling upon a photo-tube is utilized to control the firing of the thyratrons, while in the system about to be described, variations in light-intensity, projected continuously on a photo-tube 192b is caused to control the firing of the thyratrons. A rotary shutter 201, of steel, Duralumin or similar opaque material is attached integral with the slow-speed shaft 175b of a speed-reducer 170b. Limiting-stops (not shown) are provided, to limit the total arcuate movement, through which the shutter 201 can be displaced, to the angular dimension of the aperture 204. The aperture 204, whose proportions are illustrated in Figure 32, is provided in the shutter 201. A light-tight enclosure (not shown) is closed at its end nearest the shutter 201, Figure 28, by the diaphragm 202. This diaphragm is provided with an aperture (not shown) identical to the aperture 204. Shutter 201 is so positioned in relation to the diaphragm that one-half of the area of the diaphragm's aperture is in exact register with one-half of the area of the shutter's aperture when the shutter 201 is at the mid-point of its arcuate movement. With this relationship between the two apertures, rotation of the shutter 201 to one limit of its angular movement will reduce the effective areas through the apertures to zero, while maximum rotation of the shutter in the opposite direction will cause both apertures to be in exact registry. In the latter position, light projected from the lamp 183, upon the photo-tube 192b will be at its maximum intensity while in the former position the light will be at its minimum value.

In this manner the light-flux, falling upon the photo-tube can be controlled from its minimum to maximum value by the angular setting of the shutter 201. Since there are many circuits utilizing photo-tubes to effect the control of gaseous triodes such as thyratrons, it is not considered necessary to go into the details of such circuits.

Suffice it to say that such circuits use photo-tubes as the variable resistance elements in their phase-shifting controls being generally connected so that the photo-tube and thyratron-anodes are positive during the same half of the cycle. Because the very high resistance of photo-tubes and the difficulty of obtaining comparable reactance at commercial frequencies by means of an inductance, a condenser generally is used as the reactive element in the phase-shifting circuit.

Figure 29 illustrates a third thyratron-controlled, direct-current motor-drive. In this circuit rotation of the speed-reducer 170c changes the positioning of the core 210 of a solenoid 211, the coil of which is in one side of the thyratron grid-control bridge. The reactance of this solenoid determines the phase relationship between grid and plate of each tube and thereby governs the average current taken by the motor 171c through the thyratrons. As the core 210 is moved into the winding of the solenoid 211, the reactance is increased and the phase of the grid is so controlled that the thyratrons pass less current to decrease the rate of rotation of the motor 171c. Hence the motor's speed is instantly changed with each new position of the core 210. The speed-reducer 170c may be considered to be identical to the similar units illustrated in Figures 20, 21, 27 and 28. Also, its rate and direction of rotation is regulated in exactly the same manner in which the just enumerated speed-reducers are controlled. The slow-speed shaft 175c, of the speed-reducer 170c, has a threaded extension 222. The core 210, which cooperates electrically with the windings of the solenoid 211, has a bore extending partially through its length. The bore is internally threaded. The tapped thread is identical to the thread generated along the length of the threaded extension 222. The core should be prevented from rotating in relation to the solenoid by means of a key and key way (not shown). As may be seen from Figure 29, the extension 222, is threaded into the core 210. Rotation of this threaded extension in one direction moves the core inwardly into the windings of the solenoid which causes an increase in the reactance of the thyratron circuit to reduce the average current supplied to the motor 171c to a value exactly proportional to the new position of the core. Conversely, opposite rotation of the shaded-pole motor causes the speed of the motor 171c, to be increased in proportion to the core's outward movement from the solenoid 211.

Figure 30 is a schematic illustration of a hydraulically-actuated, work-table of a machine-tool, whose linear-displacement is controlled from instant to instant by certain methods and means constituting the invention. An electric motor 240, is continuously supplied with current from the mains 252, and 252a, by the conductors 253 and 255. A constant-displacement hydraulic pump 241, is direct connected to the, preferably 60-cycle alternating-current, motor 240. Oil from the reservoir 256, is constantly supplied to the pump by the intake pipe 241a. The oil is discharged through the outlet pipe 242, to the pressure regulator 243. The function of this regulator is to automatically allow the output of the pump to be valved into the reservoir 256 at any time that the oil pressure exceeds a predetermined pressure. The oil flows from the regulator 243, to the valve-body 246, through the conduit 244. The valve-body 246, and the spool 245, constitute a balance-type hydraulic-valve. The two large-diameter lands of the spool are preferably ground to have a .0005" clearance with the ground bore extending through the valve-body 246. Ample lubrication of these lands is insured, since the valve operates submerged in the oil filling the reservoir 256.

One port, cut in the valve-body communicates with an oil connection of the hydraulic-motor 233, through the conduit 235. A second port in the valve-body communicates with a second oil connection in the hydraulic motor by means of a conduit 234. The hydraulic motor 233, is a constant-displacement unit, whose rate and direction of rotation can be precisely controlled from instant to instant in response to the positioning of the spool 245, within the valve-body 246. Mechanically, the fluid-motor may be either a vane, gear or piston-type power-unit, although in many instances, an axial-piston type of oil-motor may be preferred due to its excellent operation at very low speeds. Such a fluid-motor comprises essentially a driving plate, a cylinder-block and suitable pistons which actuate a driving plate through connecting-rods. Figure 30, for purposes of simplicity illustrates the output-shaft of the fluid-motor to be direct-connected to the lead-screw 232, although in many instances a high-ratio gear-reduction unit will be necessary to decrease the speed of the lead-screw and to obtain increased torque applied to the lead-screw in proportion to the ratio of reduction of the unit. The lead screw 232, has threads generated along its length. The threads may be square, acme or any other desired form commensurate with good design practice. A dependent bracket 231, integral with the work-table 230, is provided with internal threads. These female threads cooperate with the threads generated along the length of the lead screw.

A meter-bar 238, is rigidly fastened to one end of the work-table 230, in parallelism with the axis of the lead screw 232. Suitable parallel slides, prepared along the upper surfaces of a bed (not shown), slidably support the work-table as it is displaced along the length of the bed in response to the rotation of the lead-screw. The meter-bar 238, is used in exactly the same manner that the meter-ribbons 22 and 31, Figures 19 to 24, are used. However, the meter-bar 238, in order to be self-supporting is preferably made of Invar bar-stock whose cross-section may be 1" x 1" or more. Apertures (not shown) which, for purposes of description, will be understood to have the same dimensions as the apertures 35, cut along the lengths of the meter-ribbons 22 and 31, are pierced through and along the length of the meter-bar in such a manner that parallel light, projected downwardly in a vertical direction from the lamp 236 and lens 237, will emerge from these apertures in the form of a plurality of parallel light pencils whose spacing will be exactly .040" and whose cross-sectional areas will each be precisely .020" x .020". If desired, a meter-ribbon similar to the meter-ribbons described in the fore part of this disclosure may be cemented to a rod of transparent fused-silica having sufficient mechanical strength to allow for its cantilevered support. Another form of meter-bar made of "Pyrex" No. 774 glass could be used to obtain a high degree of accuracy due to its extremely low thermal coefficient of expansion and high mechanical strength. The glass bar would be prepared by having two parallel faces ground along its length. One face would be made opaque to light-transmission by having aluminum, silver, copper or other metal sputtered or evaporated upon its surface. Apertures, as narrow as .005" wide or less, could be cut along the length of this opaqued face by mechanical removal of certain areas of the opaqued face, by chemical etching or by photographic engraving.

The luminosity from the projection-type lamp 236, is collected and brought into parallelism by lens 237. The light is broken up, as stated, into a plurality of equidistant pencils of light each of whose cross-sectional areas is exactly .020" x .020" square. The downwardly projected light-pencils strike the control-film 257, normal to its upper surface. It will be understood that the film 257, Figure 30, is illustrated in a cross-section taken through its width. Therefore, the length and direction of movement of the control-film will be taken to be normal to the surface of Figure 30.

That section of the meter-bar within the zone of luminosity of the lamp 236, and the transparent traces (not shown but similar, for example, to the traces lying in either one of the two control-lanes photographed on the film, Figures 17 and 18), impressed on the length of the control-record 257, jointly form a flux-gate whose functioning is identical to the operation of the flux-gates already described. The residual luminosity, passing through this flux-gate in a downward direction, is caused to be converged and projected upon the light-sensitive surfaces of the photo-tube 247 by means of the plano-convex lens 239.

It will be understood that the photo-tube 247, and amplifier 248, are identical to similar elements illustrated by Figure 23 and that a shaded-pole motor, similar to the one also schematically illustrated in this figure is used. The ratio of the gear-reduction within the housing of the speed-reducer can be selected for a rate of response which depends upon the type of work or tool support of a machine-tool being controlled by the system. The slow-speed shaft 259, is threaded and cooperates with female threads tapped through the length of the valve-spool 245. As in the operation of the solenoid-controlled motor driven system, illustrated by Figure 29, the spool 245 is positioned in relation to the parts, cut in the valve-body 246, by the rotation of the slow-speed shaft 259.

With the system in equilibrium, the motor 240 is energized with alternating current to cause continuous rotation of the oil pump 241. Oil under the desired working pressure will be delivered to the balance type valve. The filament of the lamp 236 is lit and the main winding of the shaded pole motor, Figure 23, within the speed-reducer 250 is simultaneously excited with 110 volt 60-cycle alternating current from the mains 252 and 252a. Since the system is in equilibrium the hydraulic balance-valve and the flux-gate, comprised of the transparent traces on the control-film and the apertures in the meter-bar 238, would be in their neutral or control point positions. The system remains in this balanced state, with the work-table in a locked immovable condition as long as the traces are parallel to the edges of the film 257.

For purposes of description the following assumptions will be made; movement of the traces towards the left hand edge of the control-film 257 causes the area of the flux-gate to increase. Opposite displacement of the traces towards the right hand edge of the film causes the area of the flux-gate to be reduced. Increase in luminosity, falling upon the photo-tube 247, above the quantity limited by the flux-gate's control-point position causes the shaded-pole motor to rotate in such a direction that the spool 245 is displaced to the left towards the speed-reducer. Decrease in luminosity below the control point value of the flux-gate causes opposite rotation of the motor and opposite displacement of the spool to the right. It will also be assumed that any displacement of the spool in a left-hand direction from its neutral point, illustrated in Figure 30, will cause the oil motor to be rotated in such a direction that the work-table and meter-bar 238 will be displaced in a left-hand direction at a rate proportional to the distance that the spool 245 is positioned to the left of the neutral point. Obviously upon the spool 245, being displaced to the right of the neutral point, the oil motor will rotate in the opposite direction and at a rate proportional to the distance that the spool is positioned to the right of its neutral-point.

Under the above assumed operating conditions, the work-table and meter-bar are instantaneously advanced in a left-hand direction as viewed in Figure 30, when the transparent traces are slightly displaced perpendicularly towards the left hand edge of the film 257. Similarly, any displacement of the traces towards the right-hand edge of the film causes the spool 245 to be moved, by the controlled rotation of the speed-reducer, to the right of the valve's neutral-point causing displacement of the work-table and meter-bar in a right-hand direction.

The speed-reducer 250, Figure 30, is, therefore a positioning device which is rotated only at those instants that there is a variation between the rates at which the photographed traces and the meter-bar 238, are simultaneously displaced perpendicular to the edges of the control-film 257. The system illustrated by Figure 30, as well as the other systems, herein described used the null-point method of control, the null-point being obtained at all times that the flux-gates are in their control-point positions. Therefore, any change in the setting of the flux-gate, Figure 30, from its control or null-point position creates an immediate unbalance in the system to cause instant movement of the spool 245, in the proper direction and amount to change the rate of displacement of the work-table 230 in such a manner that the complete control system is brought back to its null-point.

The control-systems heretofore described and illustrated have made use of luminous-flux as the control media which is constantly regulated by the various types of flux-gates. Figures 33 to 40, illustrate a second species of system which utilizes variations of intensity of electro-magnetic flux to control the carriage and slide of an engine lathe. Figure 40 is a schematic illustration of the complete system. A control-record 300, is wound on the storage reel 301, and is driven at a constant predetermined rate by a drive motor and driving reel (not shown) but similar to the driving means illustrated by Figure 12. Figure 33, illustrates two separate lanes impressed along the length of the control-record 300. The upper lane as viewed in this figure is the Y—Y lane, since the perpendicular displacements of the channels 303 within the borders of this lane control the displacement of a lathe slide, Figure 40, parallel to the Y—Y axis of a two-dimension Cartesian coordinate system. The lower lane, parallel to the Y—Y lane is the X—X lane since the perpendicular displacement of the channels 203 from instant to instant control the movement of the carriage of the lathe, parallel to the X—X axis of the co-ordinate system.

The X—X and Y—Y lanes may be separately made in the manner described and illustrated in Figures 1 to 6 and then cemented side by side to a very thin, tough strip of flexible plastic. However, instead of filling the parallel grooves, generated along the length of the lanes with an opaque pigment as indicated in the description of these figures, the grooves are completely filled, with powdered iron, "Permalloy" or any other finely comminuted substance having high permeability. The output of an electronic oscillator 302 is led to the driving coils 304 and 305, each of which consists of many turns of fine, enameled or otherwise insulated copper magnet-wire, by the conductors 306, 307, 308 and 309. The output of the oscillator may be an alternating current of some 2,000 or 3,000 cycles per second. The driving coil 304 is wound about one section of a flux-bar 311. The flux-bars may be made of electrolytic or "Armco A" iron, certain types of "Permalloy" or any other material having a high transmissibility to alternating electro-magnetic flux whose frequency is approximately 3000 C. P. S. The two flux-bars are of the general shape indicated by the plan view Figure 33. As may be seen from this figure, each of these members have the outline of an inverted L. The right-hand end of each horizontal leg, as viewed in Figure 33, is bored with its axis substantially parallel to the vertical leg. The vertical leg of the flux-bar 310 extends downwardly, as viewed in this figure, to the lower edge of the X—X lane. The vertical leg of flux-bar 311 terminates at the lower edge of the Y—Y lane. Figure 34 is a vertical cross-section taken through the axis of the bore machined through the flux-bar 311. Two "Selsyn" motors 316, and 317 similar, electrically and mechanically, to the similar elements 78, 79 and 80, Figures 13 and 14, serve to rotate two pickups 312 and 313 respectively. These identical pickups, constituted of material similar to that from which the flux-bars are made, have V-threads generated along their lengths. Their proportions are more or less similar to those illustrated and, as shown, have double-threads. The distance from any point on one thread to the same point on an adjacent thread, measured parallel to the pickup's axis is identical to the distance from the center of one channel 303 to the center of an adjacent channel. The pickup 312 is press fitted on the end of a shaft 314, while the pickup 313, is similarly affixed to the end of a shaft 315. These shafts, which are made of Armco "A" or similar material, terminate at a point close to the housings of the "Selsyn" motors 316 and 317. As may be seen from Figure 34, a pickup coil 324, is positioned concentrically about the shaft 314. The coil consists of many turns of fine enameled magnet-wire wrapped about a spool 319, made of Bakelite or similar material. The pickup coil is stationary with a clearance between the spool's bore and the small-diameter section of the shaft 314. The shaft's diameter is increased where it passes through the bore of the flux-bar 311. The shaft 314 is mounted concentric to and integral with the rotor-shaft of the repeater 316. A clearance of .001" or less is maintained between the flux-bar's bore and the shaft. That section of the flux-bar 311, which extends over the Y—Y lane, Figure 33, terminates in a dependent integral leg 311a, as illustrated by Figure 35. The end of this leg is ground to afford a smooth plane-surface which bears against that area of the control record 300 which is occupied by the Y—Y control-lane. The ferromagnetic powder, filling the grooves cut in the control-record 300, constitute the control-channels 303. The surfaces of the control-channels are, therefore, continuously separated from this plane-surface by the thickness of the thin plastic strip similar to the ribbon 9, Figure 6, which is cemented to the upper surface of the control-record 300. For purposes of clarity in reading, Figures 33, 34 and 35, the representations of the electrical leads 306, 307, 308, 309, 320, 321, 322 and 323, Figure 40, have been purposely omitted. However, from Figure 40 it will be seen that the driving coils 304 and 305 wound about the flux-bars 310 and 311 are supplied with alternating current from oscillator 302 through the conductors 306, 307, 308 and 309. The pickup-coil 325, wrapped about the shaft, 315 is identical to pickup-coil 324.

Figures 37, 38 and 39 represent the positioning of the ferrous threads, cut along the length of one of the pickups 312 or 313, in relation to the channels 303, with different angular displacements of the pickup about its axis of rotation. Figure 37 illustrates these threads to be exactly midway between the channels 303. Therefore, with the driving coil of the circuit excited with alternating current, the magnetic-flux, flowing in the circuit, will have to pass through a non-magnetic path, whose length is the distance between the pickup's threads and the ferromagnetic channels. With a slight angular movement of the pickup about its axis, the threads are brought closer to the channels 303, as illustrated by Figure 38 to decrease the length of non-ferrous gap, through which flux, circulating in the magnetic system, must flow. Figure 39 illustrates a condition, caused by a further rotation of the pickup in the same direction, in which the pickup threads are in complete register with part of the area of the channel. With the threads in this relationship to the channels 303, the flux, passing through the complete magnetic circuit, will be of maximum value. Obviously, the alternating current, inductively built up in the pickup coil, will also be at its maximum.

From the above description it will be seen that the functioning of the X—X and Y—Y flux-gates, illustrated by Figures 33, 35 and 40, each consisting of a pickup, shaft, flux-bar, driving coil and pickup-coil with the cooperating flux conducting channels impressed on the control record 300 is fundamentally identical to the operation of the flux-gates, illustrated and described in the fore part of this disclosure. In the former flux-gates, electromagnetic energy was caused to be governed in amount by their opening or closing, while in the X—X and Y—Y flux-gates, utilized by the system illustrated by Figure 40, the magnitude of magnetic-flux is continuously regulated from instant to instant by controlling the length of the air-gap between the ferromagnetic channels and the pickup's threads.

Figure 36 is a graphical representation of the amplified alternating-current output of either pickup-coil after amplification and illustrates three current-amplitudes obtained by different positioning of the threads of the pickup, relative to the channels 303, as illustrated by Figures 37, 38 and 39.

Figure 36 graphically represents the magnitude of the alternating-current output of the amplifier 327, when the threads of the pickup 313 are in the positions relative to the channels illustrated by Figures 37, 38 and 39. After necessary amplification, the alternating-current is rectified. The rectified value of this direct-current is also graphically represented by the heavy dash-dash lines extending in steps across Figure 36. It will be assumed that the relative position of the pickup's threads to the channels 303, illustrated by Figure 38, is the control or null-point of both the X—X and Y—Y systems used by the automatic lathe control, illustrated by Figure 40. Therefore, a slight angular movement imparted to either pickup in one direction from the control or null-point position, Figure 38, increases the distance between the threads and the ferromagnetic channels as shown by Figure 37. From Figure 40 it will be seen that the output of the pickup-coils 324 and 325 are led to the electronic amplifiers 326 and 327 respectively through the leads 320, 321, 322 and 323.

The lengths of the flux-bar 310 and shaft 315, Figure 33 are longer than the flux-bar 311 and the shaft 314, Figure 33. The elements illustrated at the lefthand of Figures 33 and 35, with the cooperating ferromagnetic channels 303, lying within the X—X lane of the control record 300, constitutes the X—X flux-gate of the system. Likewise, the elements shown at the right hand of these figures with the cooperating Y—Y lane comprises the system's Y—Y flux-gate.

The flux-bar 310, shaft 315, pickup 313 and the ferromagnetic material of the three channels 303 of the X—X lane, jointly constitute a magnetic circuit since magnetic flux will flow through these elements when the driving coil 304 is energized with the alternating-current output of oscillator 303. Through induction a feeble alternating-current will flow through the winding of the pickup-coil 325, which is amplified and then rectified by the electronic amplifier 327, Figure 40. The magnitude of the direct-current of control or null-point value is illustrated by Figure 34. Any rotation of the pickup from this position causes its threads to be moved towards or away from their coacting channels as illustrated by Figures 36 and 38 with an attendant increase or decrease in direct-current. It will be understood that the X—X and Y—Y flux gates are electrically and mechanically identical to one another with the exception that the shaft 315 and flux-bar 310 of the Y—Y flux-gate are longer than corresponding members of the X—X flux-gate. It will be further understood that X—X amplifier 327 and Y—Y amplifier 334 are identical.

The direct-current output of the X—X amplifier 327 is led to a control coil (not shown) of an amplidyne 330, through the conductors 336, and 337. Since the functioning of amplidynes and similar types of direct-current generators is understood by many engineers and since they are readily available in commercial form, it is not considered necessary to describe these elements in any detail. However, it may be stated that the output of an amplidyne is equivalent to two conventional generators, the first excited by a control signal; the second excited by the first. However, an amplidyne does not have the cumulative delay inherent to two generators since it combines the two units into one. By means of armature excitation it uses the same structure twice. Thus its response to a signal impressed on a control field is practically instantaneous.

The amplidyne 330, is direct-connected to preferably a 50-cycle, alternating-current, induction motor 331, which is energized with current from the alternating-current mains 332 and 333, through two connecting leads. Similarly the amplidyne 334 is direct-connected to a motor 335, which is identical to motor 331 and which receives its exciting current from the same mains 332 and 333. The variable direct-current output of the X—X amplifier 327, is led to the control-field (not shown) of amplidyne 330, by the conductors 336 and 337. In the same manner, the control-field (not shown) of the second amplidyne 334 is excited by the output of the direct-current output of the amplifier 326 which are connected by the two conductors 338 and 339.

A powerful servo unit, consisting of a direct-current motor 340, a mechanical, gear-type differential 341 and a 60-cycle alternating-current synchronous motor 342, serves to rotate the longitudinal lead screw 352, whose rotation controls the displacement of the lathe carriage 343, parallel to the X—X axis of a two-dimensional Cartesian coordinate system. The rotor-shaft of the synchronous motor is direct-connected to one power input-shaft of the differential 341. The armature shaft of the direct-current motor 340 is similarly attached to a second input-shaft of the differential. The synchronous-speed of motor 342, will be taken to be 1800 R. P. M. when its field winding is excited with 60-cycle alternating current from the mains 332 and 333. The speed range of the direct-current motor 340 will be understood to be from 300 R. P. M. to 3300 R. P. M. The differential output shaft 341, is illustrated in Figure 40 as being direct-connected to the lead-screw 352, although provision of a gear-reduction between the screw and differential can be made, if desired. The various electrical circuits of the X—X axis control-system are so adjusted that the rate of rotation of the armature shaft of motor 340 is exactly 1800 R. P. M. at such times that the direct-current output of the electronic amplifier 327, is at a predetermined magnitude. This current magnitude which is impressed on the control-field of the amplidyne 330, will be obtained only at such instants that the threads, generated along the length of the pickup 312, Figure 33, are separated from the cooperating flux-transmissive channels by the amount illustrated by Figure 38. The amplidyne circuit is also adjusted in such a manner that the direct-current motor 340, will be caused to rotate at approximately 300 R. P. M. at such instants that the separation between the pickup's threads and the ferromagnetic channels, in the X—X lane of the control-record 300, is maximum. This condition is shown by Figure 37. The amplidyne control circuits are also adjusted so that the armature shaft of the direct-current motor 340, will rotate at its maximum speed of 3300, at such instants that the threads of the pickup 313, are so positioned, in relation to the channels 303, that maximum alternating magnetic-flux flows through the magnetic circuit of the X—X flux-gate. Such a relative disposition of the threads to the channels is indicated by Figure 39.

The mechanical-type differential 341, is so designed that its output-shaft is static when the speeds of the two motors 340 and 342 are identical. This condition is obtained at such instants that the rotative speed of the direct-current motor 340 is exactly 1800 R. P. M. This speed, as stated, is obtained when the threads of the pickup 312 of the X—X flux-gate are in their control or null-point position in relation to their magnetically coacting channels as illustrated by Figure 38. However, with the gap between the threads of the pickup and the channels at its maximum, as illustrated by Figure 37, the motor 340 is caused to rotate at its minimum angular velocity of 300 R. P. M. Neglecting any speed reducing gears within the differential 341, its output shaft and, therefore, the integral lead screw 352 would rotate clockwise, at an angular rate of 1800—300=1500 R. P. M. where 1800 is the speed in revolutions per minute of the synchronous motor 342. Conversely, with the direct-current motor 340 revolving at its maximum speed of 3300 R. P. M. the rate of rotation of the output shaft of the differential 341 would be: 1800—3300=—1500 or 1500 R. P. M. opposite to that taken when the motor 340 was rotated at 300 R. P. M.

The slide 371 and carriage 343 of the engine-lathe illustrated in plan by Figure 40, are, therefore, linearly displaced by amounts and directions controlled from instant to instant by the magnitude and direction of displacement of the channels 303, measured perpendicular to the length of the control-record 300, upon which they are impressed. It is obvious that any positioning of the threads of either pickup 312 or 313, Figures 33 and 34, relative to the magnetically coacting channels 303, between the two extreme positions illustrated by Figures 37 and 39, will cause a corresponding increase or decrease in the rotative speeds of the two lathe lead-screws 352 and 360. It will be apparent that the magnetic-type flux-gates, used to control the magnitude of the signal, impressed on the control-coils of the amplidynes 339 and 336, can just as readily be utilized to govern the rate and direction of rotation of shaded-pole motors, similar to the motors, whose operation have been already described. These magnetic-type flux-gates can also be incorporated in thyratron grid-control circuits to control the rate of rotation of direct-current motors as well as many other types of motor-controls.

A third control system, which makes use of the fundamentals of the invention in its operation, is illustrated by Figure 44. The control media of the system is fluid-flux in contradistinction to electro-magnetic flux and magnetic-flux used respectively by the first and second systems described and illustrated in the fore part of this disclosure, to initiate the control of movements of fabricating-machine elements. Oil under pressure is lead to the valve-body 410 by the conduit 411 from a source of pressurized fluid such as a hydraulic pump. The bore through the valve-body slidably encloses a valve-spool 412. These two elements constitute a balanced-type hydraulic valve. Figure 44 illustrates the valve in its neutral position. When the valve is in this position no oil can flow to the power cylinder 413 from the valve-body through the two ducts 414 and 415 since the lands of the valve-spool 412 cover the two ports 414a and 415a cut through the valve body.

A piston 416, of conventional design is provided inside the cylinder. A piston-rod 417, integral with the piston, extends through the ends of the cylinder. Oil is prevented from escaping from the cylinder by provision of packing glands which bear against the piston-rod. The ends of this piston rod are rigidly fastened to two dependent arms 460 and 461, integral with a work-table 419. The work-table is supported by a bed or support (not shown) which allows the table to be linearly displaced in a substantially frictionless manner at the moments that the hydraulic system is activated.

A meter-bar 401 is mounted integral with the work-table 419, in such a manner that its length is in exact parallelism with the direction of the work-table's linear movement. The meter-bar cooperates with the control-record 400 in such a manner that these two members constitute a species of flux-gate which constantly regulates the magnitude of fluid-flux. The flux-gate, illustrated at the left-hand side of Figure 44 is shown in enlarged scale by Figures 41, 42 and 43. It will be understood that the direction of travel of the control-record 400, Figure 44 is normal to the surface of Figure 44. It will be noted that Figures 41, 42 and 43 illustrate the meter-bar as having ribbon-like thickness instead of having considerable depth as indicated by Figure 44. However, a thin ribbon-like meter-bar may be utilized if desired, by keeping the member under tension in such a manner that its upper surface is kept in parallelism with the plane-surface of the work-table 419. The meter-bar can be displaced only in directions perpendicular to the length of the control-record 400 as shown by Figure 41.

The control-record 400, is prepared in the manner disclosed in the fore part of this specification which is illustrated by Figures 1 to 4. Therefore, grooves 406, are mechanically cut along the length of the plastic strip which constitutes the body of the control-record. The under-surface of the meter-bar 401 is brought into intimate contact with the upper surface of the control-record as shown by Figure 43. Since these two surfaces are very smooth, relative movement between these members is accomplished with a minimum of friction. It will be assumed that the thickness of the control-record is .050" while its width is 1.000", and that the grooves are .020" wide by .030" deep while the distance from the center of one groove to an adjacent groove is exactly .040".

A series of circular apertures 405, which may be rectangular in cross-section, if desired, are cut or drilled through the meter-bar along its length. Their diameters are exactly .020" while their spacing is on .040" centers. A plenum-chamber 402, of substantially the proportions shown and made preferably of oil-filled sintered bronze such as "Oilite" is positioned with its skirt in contact with the upper-surface of the meter-bar 401. See Figures 42 and 43. The lower-edge of the skirt of the plenum-chamber is machined to afford a plane-surface which is pressed against the meter-ribbon to afford a substantially gas-tight joint. Fluid, preferably air, is continuously admitted to the interior of the plenum chamber through the pipe 403. The air is supplied at a constant rate from a constant-displacement pump (not shown). A conduit 404 communicates the pressure of the fluid in the plenum chamber with a flexible, metal bellows 425, Figure 44. The bellows is mounted within an expansion chamber 427. One end of the bellows is soldered or brazed to the skirt of the expansion chamber to make a gas-tight joint. The opposite end of the bellows is similarly fastened to the end of the conduit 404. The conduit is rigidly supported so that any expansion of the bellows causes the expansion chamber to move in a right-hand direction toward the valve-body 410 while contraction of the bellows produces opposite movement of the chamber 427. The expansion chamber is closed at one end by an integral head 428. A compression spring 430 extends between the valve-body and the head of the expansion chamber.

Air is admitted at a constant rate to the plenum chamber 402. Figure 43 illustrates the fluid flux-gate, consisting of the plenum chamber, meter-bar 401 and control-record 400, in its neutral or control-point position. When the flux-gate is in this position the effective cross sectional areas of the apertures, through which fluid can flow, is reduced exactly 50% since one half of the area of each aperture is in communication with its coacting fluid-transmissive groove 406. Therefore, if the meter-bar 401, is moved exactly .010" in a right-hand direction from the neutral position shown by Figure 43, the apertures 405, in contact with the control-record 400 will be completely closed. Similar movement but in a left-hand direction from the control or neutral position will cause the apertures in the meter-bar to be fully opened. Figure 42 taken in cross-section through the flux-gate in a plane parallel to the length of the control-record shows how the fluid is vented to the atmosphere by flowing along the grooves 406.

It will be assumed that the pressure of the fluid filling the plenum chamber, is maintained at exactly 20 pounds per square inch by the throttling action of the half closed apertures when the flux-gate is in the neutral position illustrated by Figure 43. It will also be assumed that the fluid pressure rises to exactly 30 pounds per square inch when the apertures are completely closed by the surfaces of the control-record lying between the grooves 406. It will be further assumed that the pressure drops to 10 pounds per square inch when the areas of the meter-bar's apertures are unobstructed. The pressure within the plenum chamber is constantly communicated to the space between the bellows 425 and the expansion chamber 427. The valve stem 431, which is integral to the valve spool 412, is rigidly fastened to the head 428 of the expansion chamber, due to changes in the pressure of the fluid within the plenum chamber, causes a similar displacement to be imparted to the valve-spool 412.

The physical properties of the compression-spring are such that the valve spool is positioned at its neutral point in relation to the valve body 410 at such times that the fluid pressure within the plenum chamber and, therefore, the expansion chamber is exactly 20 pounds per square inch. Upon the pressure rising to 30 pounds per square inch the spring is further compressed to allow the valve-spool to be displaced to its right-hand limit of travel as viewed by Figure 44. Conversely, the valve-spool is moved to its left-hand limit of travel when the pressure of the fluid, filling the plenum and expansion chambers, drops to 10 pounds per square inch.

By referring to Figure 44, it will be seen that displacement of the valve spool 412, from its neutral position in a right-hand direction, causes oil under pressure to be delivered to the right-hand end of the hydraulic cylinder 413. Oil, admitted to this end of the cylinder, causes the piston 416, piston-rod 417, work-table 419 and meter-bar 401 to be moved in a direction towards the left of Figure 44 and at a rate proportional to the displacement of the valve-spool from its neutral position. Conversely, oil admitted to the left-hand end of the cylinder causes the work-table to be displaced in a right-hand direction.

From the foregoing description of the system it will be seen, upon the areas of the apertures, being reduced more than one-half, that the valve-spool is moved to the right to cause the work-table 419 to be moved to the left. Similarly, with the effective areas of the apertures being increased more than one-half the work-table and the integral meter-bar 401, are moved in a right-hand direction due to the spool 412, being displaced to the left of its neutral point.

Therefore, by the use of the system just described, it will be seen that the rate and direction of movement of the work-table and its integral meter-bar is controlled from instant to instant in exact response to the magnitude and direction of displacement of the channels 406, perpendicular to the edges of the control-record along whose length they are cut.

Figure 45 illustrates a control-record of circular form which, upon rotation, is capable of controlling one or more operations of a machine-tool or fabricating device. It is also capable of governing the opening or positioning of valves, gates, feeders or similar devices used in material-processing, which must be positioned in a predetermined sequence. The circular control-disc 500, is preferably made of transparent plastic such as "Lucite" or "Plexiglas" although optical glass may be used, if desired. The traces 501, impressed on the film, are originally photographed on an emulsive-coat which covers one surface of the control disc. During the operation of recording or photographing the traces, the unexposed control-disc is caused to be rotated at a rate identical to that at which it will be later operated. Two discs 502 and 503, are separated from the sensitized surface of the control-disc by some .001" or more. These discs are identical to the discs 90, 91 and 92, illustrated by Figures 14 and 15. Light-flux from two projection-type lamps 504 and 505, Figure 46 is projected, during the operation of recording, upon that area of the annular ring, in which the helices are located on the discs 502 and 503. It will be understood that the light, passing through the transparent helices, impresed on the discs 502 and 503 and then upon the control-disc 500, causes traces to be photographed on the light-sensitive emulsion in exactly the same manner that the traces were photographed on the film 94, Figures 14, 15, and 16. However, due to the rotation of the control-disc during the photographing process, it will be seen that the traces 501 will normally appear as concentric radially-disposed parallel lines at such instants that either the control-disc 502 or 503 is static. It will be seen that the traces are displaced in a direction perpendicular to the direction of rotation of the control-disc; the amount and direction of perpendicular displacement being a function of the amount and direction of rotation of the helical disc 502 or 503.

Figures 45 and 46 illustrate a displacement-reproducer. Two annular control-lanes 510 and 511 are provided upon the surface of the control-disc. The helical, control traces 501 lying therein are transparent to light-flux. The traces lying within the area of the control-lane 511 cooperate with the transparent helices impressed on the disc 502 to form a single flux-gate. Similarly, the traces, within the confines of the control-lane 510, cooperate with the transparent helices of the disc 503 to afford a second flux-gate. The control disc 500 may be rotated at a continuous rate by being mounted on the slow-speed shaft of a clockworks 540 as shown or in any other desired manner. Luminosity from the lamp 504 is projected through the helical disc 503, aperture 512, which is cut in the light-stop plate 513, and then through the control-lane 510 to finally fall upon the light-sensitive area of the photo-tube 514. A photo-tube 515, similar to the first tube, is excited by light which is projected upon it after passing through the flux-gate comprised of the helical disc 502, aperture 516, cut through the light-stop plate 516, and the control lane 511. An amplifier 517 is connected to the photo-tube 514 through the leads 521 and 522. The two amplifiers with their controlling photo-tubes will both be considered to be identical to the amplifier schematically illustrated by Figure 23. The output of the amplifier 517 is led to the shaded-pole, motor-driven speed-reducer 525, while a second identical motor-driven speed-reducer 526, is excited by the output of amplifier 509. The shaded-pole motors which drive these two speed reducers will be considered identical to the shaded-pole motor illustrated at the right-hand side of Figure 23. Therefore, the operation of the speed-reducers 525 and 526 will be the same as the operation of the speed-reducers 109, Figures 22 and 114, Figures 21 and 24. The slow-speed shaft of the speed-reducer 525 mounts a pinion 527 which is in mesh with the gear 528. Although not shown it will be assumed that the gear 528 is concentrically fastened to the end of the plug of a valve and that movement of the gear in one direction causes the valve-plug to be moved in such a direction that the area through the valve increases while opposite rotation of the gear 528 causes a reduction of the valve's effective area. The slow-speed shaft of the speed-reducer 526 is mounted with a crank 530. A link 531 is hinged on the front edges of two louvers 532 and 570. The lower-end of the link terminates in a connecting-rod 533, which is operated by the rotation of the crank 530. Movement of the crank in one direction causes the louvers to be rotated in such a direction as to open them. Opposite movement of the crank causes the areas between the louvers to be reduced.

Rotation of the gear 528 is reproduced by the helical disc 503 being connected to the gear by a flexible-shaft 535. Similarly, the helical disc 502, is rotated in reproduction of the arcuate movement of the crank 530 by means of the flexible-shaft 536 which connects these two members.

Figures 44, 45 and 46 are intended mainly to illustrate that a circular-type of control-record can be used to effect the controlled displacements of various mechanical members instead of a ribbon-like type of control-film whose preparation and use has been fully described. In some applications, where extreme simplicity, very short controlled displacement cycles and limited space requirements are met, it will be found that the use of circular control-records will be most satisfactory.

This specification has fully described systems whose functioning depend upon the constant governing or regulation of one of three different forms of flux viz: electro-magnetic flux, such as luminosity from a lamp; magnetic flux, such as flux from an electromagnet and fluid flux such as compressed gases. A fourth or electro-static flux could also be used in some installations if desired. Such a system could be obtained by filling the grooves, cut in the control-record 6, Figures 1 to 4, with copper or aluminum so that these metallic strips would act as a gang of condenser plates connected in series. A helical pickup similar to the pickups 312 and 313, separated by a few thousandths of an inch from the control-record, could act as one half of a condenser, with the metal, filling the grooves cut in the control-record, acting as the other half.

It will be understood that the use of the shaded-pole control-circuit illustrated by Figure 23 is not an essential to the invention as there are many electronic circuits which may be used to control the rotations of small-servo alternating or direct-current motors. It should also be understood that in some systems, notably hydraulic power-units, the use of small valve-positioning motors may be entirely eliminated by the use of solenoids.

In many places throughout the specification and drawings, the use of various elements such as overload relays, time-delay relays, pressure limiting valves, switches and other kindred devices have been purposely left undescribed and illustrated for sake of brevity. Their use, however, will be immediately apparent to those who design equipments which are to be controlled by one of the various forms of the invention. It will also be understood that instrumentalities other than those herein disclosed can be used in conjunction with the flux-gates peculiar to the invention, to effect the controlled programmed movement of various elements without departing from the spirit of the invention.

Having fully described my invention I claim:

1. A method for controlling the rate and direction of movement and the position from instant to instant of a device which comprises the steps of representing a coordinate of desired movement by a plurality of parallel traces on a control record, displacing the traces with respect to the direction of movement of the control record in a direction related to the desired movement of the device, sensing the direction of displacement of the traces and actuating a controlling mechanism for the device in response to the direction of displacement sensed.

2. The method of claim 1 characterized by the use of flux transmissive traces.

3. The method of claim 1 characterized by the use of traces permitting fluid passage.

4. The method of claim 1 characterized by the use of traces having differential flux transmissive qualities.

5. A method for controlling the rate and direction of movement and the position from instant to instant of a device which comprises the steps of representing a coordinate of desired movement by a plurality of parallel traces on a control record, displacing the traces with respect to the direction of movement of the control record at a rate and in a direction related to the desired movement of the device, sensing the direction and rate of displacement of the traces and actuating a controlling mechanism for the device in response to the rate and direction of displacement sensed.

6. A method for controlling the rate and direction of movement and the position from instant to instant of a device having a plurality of coordinates of movement which comprises the steps of representing each coordinate of desired movement by a plurality of parallel traces on a control record, displacing the traces with respect to the direction of movement of the control record in a direction related to the direction of movement of the device, sensing the direction of displacement of the traces and actuating a controlling mechanism for the device in response to the direction sensed.

7. A method for controlling the rate and direction of movement and the position from instant to instant of a device which comprises the steps of representing each coordinate of desired movement by a plurality of parallel traces on a single control record, displacing the traces with respect to the direction of movement of the control record in a direction related to the direction of movement of the device, sensing the direction of displacement of the traces and actuating a controlling mechanism for the device in response to the direction sensed.

8. A method for controlling the rate and direction of movement and position from instant to instant of a device having a plurality of coordinates of movement which comprises the steps of representing each coordinate of desired movement by a plurality of parallel traces on a single control record, displacing the traces with respect to the direction of movement of the control record at a rate and in a direction related to the rate and the direction of desired movement of the device, sensing the direction and rate of displacement of the traces and actuating a controlling mechanism for the device in accordance with the rate and direction sensed.

9. A method for controlling the rate and direction of movement and position from instant to instant of a device which comprises the steps of representing a coordinate of desired movement by a plurality of generally parallel traces on a control record, displacing the traces with respect to the direction of movement of the control record in a directoin related to the direction of desired movement of the device, sensing the direction of displacement of the traces and actuating a controlling mechanism for the device in accordance with the direction sensed.

10. The method of controlling the displacements of a member in response to displacements of a plurality of parallel flux-conductors in directions normal to the direction of movement of a control-member upon which they are impressed, comprising: displacing the control member, projecting flux into the parallel flux-conductors, varying the flux in response to the displacements of said flux-conductors and controlling the movements of the member in response to the variations of flux.

11. A method of synchronizing movements of a working member with a record of such movements on a control member in the form of a plurality of parallel traces, which comprises the steps of moving the control member, moving a record sensing device whereby the record sensing device moves from a neutral sensing position when the working member is out of exact synchronism with the parallel traces of the record, and utilizing the degree of movement of the record sensing device from neutral position to actuate a working member controlling mechanism to move said record sensing device toward said neutral position.

12. A method for automatically controlling movement of a working member which comprises the steps of moving a control record provided with a plurality of flux transmissive areas traced on the record in parallel paths having a rate of displacement with respect to the direction of movement of the record proportional to the rate and direction of desired movement of the working member, generating a flux through said areas, moving a flux sensitive device transversely of said record proportional to the rate and direction of the working member, transmitting the flux received to a control mechanism for the working member, and utilizing variations in the flux received to establish the rates and directions of movement of the working member and flux receiving device.

13. A method for automatically controlling movement of a working member which comprises the steps of moving a control record provided with a plurality of flux transmissive areas traced on the record in parallel paths having a rate of displacement with respect to the direction of movement of the record proportional to the rate and direction of desired movement of the working member, generating a flux through said areas, moving a flux receiving device having a flux receiving area substantially equal to said first named areas transversely of said record proportional to the rate and direction of the working member, transmitting the flux received to a control mechanism for the working member, and utilizing variations in the flux received to establish the rates and direction of movement of the working member and flux receiving device.

14. A method for automatically controlling movement of a working member which comprises the steps of continuously moving a control record provided with a plurality of similar flux transmissive areas traced on the record in parallel paths having a rate of displacement with respect to the direction of movement of the record proportional to the rate and direction of desired movement of the working member, generating a flux through said areas, continuously controlling a flux receiving device for movement transversely of said record proportional to the rate and direction of desired movement of the working member, transmitting the flux received to a control mechanism for the working member, and utilizing variations in the flux received to establish the rates and directions of movement of the working member and flux receiving device.

15. A method for automatically controlling movement of a working member which comprises the steps of moving a control record provided with a plurality of similar flux transmissive areas traced on the record in parallel paths having a rate of displacement with respect to the direction of movement of the record proportional to the rate and direction of desired movement of the working member, generating a flux through said areas, moving a flux receiving device transversely of said record in predetermined relation to the rate and direction of desired movement of the working member, transmitting the flux received to a control mechanism for the working member, and utilizing selected variations in the flux received to establish the rates and directions of movement of the working member and flux receiving device in both of two opposite directions.

16. A method for automatically controlling movement of a working member which comprises the steps of moving a control record provided with a plurality of flux transmissive areas traced on the record in parallel paths having a rate of displacement with respect to the direction of movement of the record proportional to the rate and direction of desired movement of the working member, transmitting flux through said areas, moving a flux sensitive device transversely of said record proportionally to the actual rate and direction of movement of the working member, transmitting the flux received by said device to a control mechanism for the working member, establishing a control point position for a given amount of flux reception, where the working member is stationary, utilizing flux received in excess of the control point position for moving the working member in one direction, and utilizing the flux received which is less than the control point position to move the working member in the opposite direction.

17. A method for automatically controlling movements of a working member which comprises the steps of moving a control record provided with a plurality of flux transmissive areas traced in predetermined parallel paths on the record, moving a flux pickup device provided with a series of flux transmissive areas transversely to the traces, generating a flux through the areas whereby a flow of flux proportional to the proximity of the areas of the record to the areas of the flux pickup device is transmitted through the pickup device, and utilizing the variance in flux so obtained to selectively actuate a working member controlling mechanism.

18. The method of controlling the rotation of a rotatable member, which comprises the steps of representing the coordinate of the desired rotation by a plurality of parallel traces on a control record, displacing the traces with respect to the direction of movement of the control record in a direction related to the desired rotation of the device, sensing the direction of displacement of the traces and actuating a controlling mechanism for the device in response to the direction of displacement sensed.

19. In combination with a work performing assembly, a record and means for moving it along a defined path, the record having a plurality of similar and generally parallel flux varying traces extending along the path of movement of the record but being at least in part divergent from the path of movement of the record, a sensing assembly opposed to the record and in flux transmitting relation therewith, means for moving said sensing assembly transversely of the record in response to variations of flux from a predetermined datum, and an actuating connection between the sensing assembly and the work performing assembly.

20. A control assembly for controlling the rate and direction of movement and the position from instant to instant of a device, which includes a record on which a coordinate of desired movement is represented by a plurality of parallel traces, at least parts of said traces diverging from the path of the record, means for imparting a movement of the traces along a predetermined path and for thereby displacing the traces with respect to their direction of movement in a direction related to the desired movement of the device, means for sensing the direction of displacement of the traces, a control mechanism for the device to be controlled, and means for actuating the control mechanism in predetermined response to the direction of displacement sensed.

21. The structure of claim 20 characterized in that the traces are flux transmissive.

22. The structure of claim 20 characterized in that the traces have differential flux transmissive qualities in relation to adjacent parts of the record.

23. The structure of claim 20 characterized in that the traces are formed to permit fluid passage therethrough.

24. In a control assembly for controlling movements of machine parts and the like, a record having on it a plurality of parallel traces having characteristics differentiated from adjacent parts of the record, means for imparting movement to said traces along a predetermined path, a sensing member opposed to said traces and movable transversely thereof, said sensing member having differential portions alignable with said traces and spaced identically with the spacing of said traces, an actuating connection between said sensing member and the part to be controlled, and means for moving the sensing member in response to deflections of the parallel traces from their path of movement.

25. A record for use in systems of control responsive to displacement laterally of traces extending along such records, which includes a record body having a defined edge and a plurality of parallel traces, said traces having portions parallel with such edge and portions diverging from parallelism with said edge, and which, if continued far enough, intersect said edge.

26. The structure of claim 25 characterized in that the record body is in the form of a flexible tape having at least one straight edge.

27. The structure of claim 25 characterized in that the record body has an arcuate edge, the traces being generally arcuately formed.

28. The structure of claim 25 characterized in that the record body and its defined edge have a substantial rectilinear extension.

29. The structure of claim 25 characterized in that the traces are flux transmissive.

30. The structure of claim 25 characterized in that the traces are flux transmissive and the adjacent parts of the record are differentially flux transmissive.

31. The structure of claim 25 characterized in that the body has a curvilinear reference edge.

LEIF ERIC DE NEERGAARD.

REFERENCES CITED

The following references are of record in the file of this patent:

UNITED STATES PATENTS

| Number | Name | Date |
|---|---|---|
| 1,172,058 | Scheyer | Feb. 15, 1916 |
| 1,343,554 | Fischer | June 15, 1920 |
| 1,838,389 | Goldberg | Dec. 29, 1931 |
| 2,092,142 | Schuz | Sept. 7, 1937 |
| 2,154,252 | Shilkoff et al. | Apr. 11, 1939 |
| 2,283,240 | Trinkle | Mar. 19, 1942 |
| 2,302,506 | Richards | Nov. 17, 1942 |
| 2,336,376 | Tandler et al. | Dec. 7, 1943 |